(12) United States Patent
Inoue

(10) Patent No.: US 10,481,844 B2
(45) Date of Patent: Nov. 19, 2019

(54) DATA COMMUNICATION METHOD AND INFORMATION PROCESSING APPARATUS HAVING MULTIPLE PRINT SETTINGS

(71) Applicant: CANON KABUSHIKI KAISHA, Tokyo (JP)

(72) Inventor: Yuki Inoue, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/150,338

(22) Filed: Oct. 3, 2018

(65) Prior Publication Data

US 2019/0114120 A1    Apr. 18, 2019

(30) Foreign Application Priority Data

Oct. 13, 2017 (JP) .................................. 2017-199801

(51) Int. Cl.
```
G06F 15/00    (2006.01)
G06F 3/12     (2006.01)
G06K 1/00     (2006.01)
H04N 1/00     (2006.01)
```

(52) U.S. Cl.
CPC .......... *G06F 3/1232* (2013.01); *G06F 3/1204* (2013.01); *G06F 3/1205* (2013.01); *G06F 3/1224* (2013.01); *G06F 3/1253* (2013.01); *G06F 3/1285* (2013.01); *G06F 3/1297* (2013.01); *H04N 1/00206* (2013.01); *H04N 1/00938* (2013.01)

(58) Field of Classification Search
CPC ............ H04N 1/00206; H04N 1/00938; G06F 3/1232; G06F 3/1204; G06F 3/1297
USPC ................................ 358/1.15, 1.1, 1.13, 1.14
See application file for complete search history.

(56) References Cited

U.S. PATENT DOCUMENTS

| | | |
|---|---|---|
| 9,298,522 B2 | 3/2016 | Natori |
| 2018/0074760 A1* | 3/2018 | Matsuura .............. G06F 3/1204 |
| 2019/0050183 A1* | 2/2019 | Inoue ................... G06F 3/1254 |

FOREIGN PATENT DOCUMENTS

JP        2010-140281 A        6/2010

\* cited by examiner

*Primary Examiner* — Douglas Q Tran
(74) *Attorney, Agent, or Firm* — Venable LLP

(57) ABSTRACT

A data communication method includes the steps of receiving from an application a request instruction including first print setting information retained by the application and a demand for prescribed processing concerning a print setting, transmitting an instruction to an information generation component provided by an operating system to generate second print setting information from the received first print setting information where the second print setting information is formed in a data structure processible in the printer driver, receiving the second print setting information generated in response to the instruction, executing the prescribed processing based on the received second print setting information, and returning a result of the prescribed processing to the application.

17 Claims, 17 Drawing Sheets

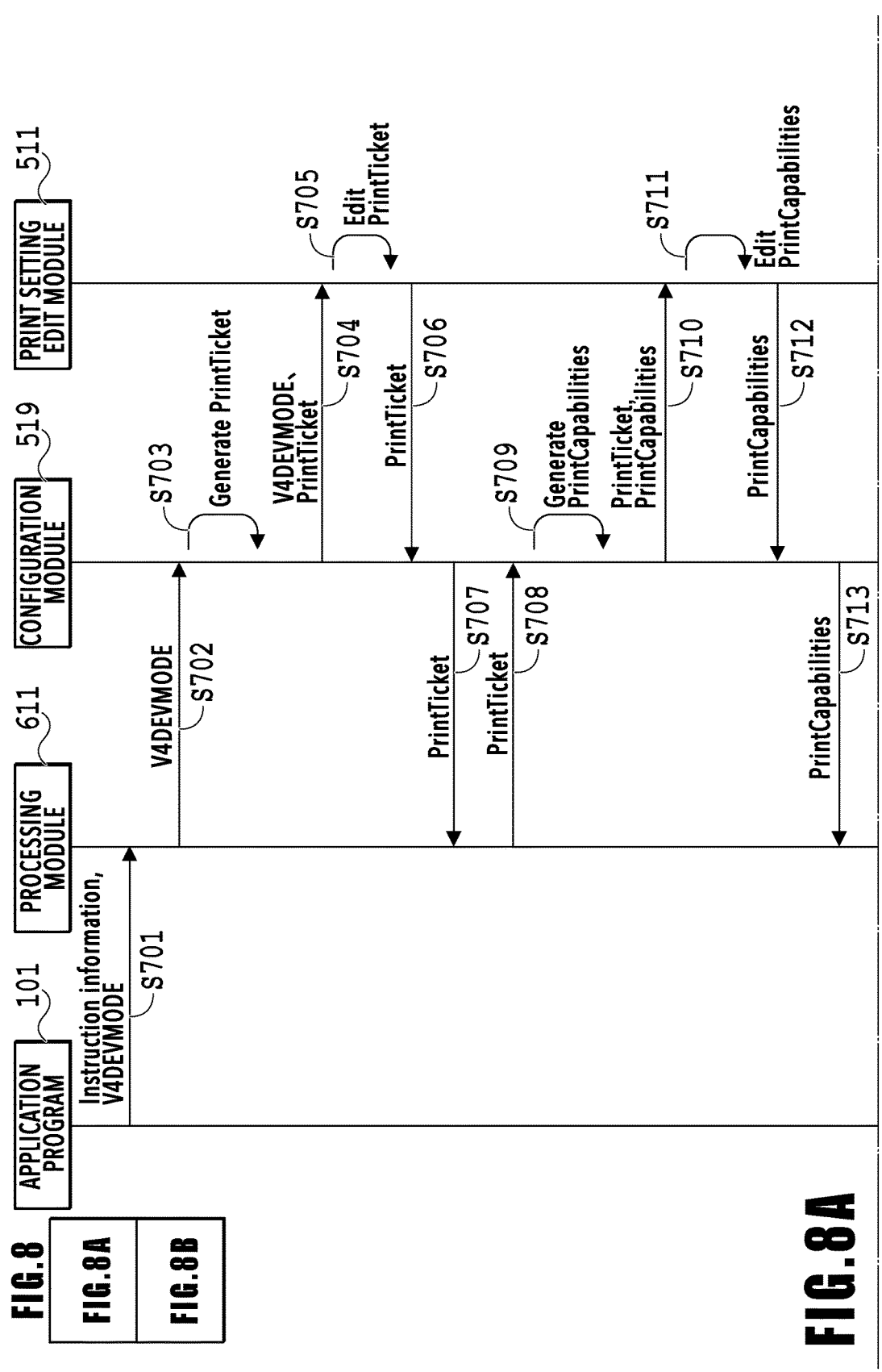

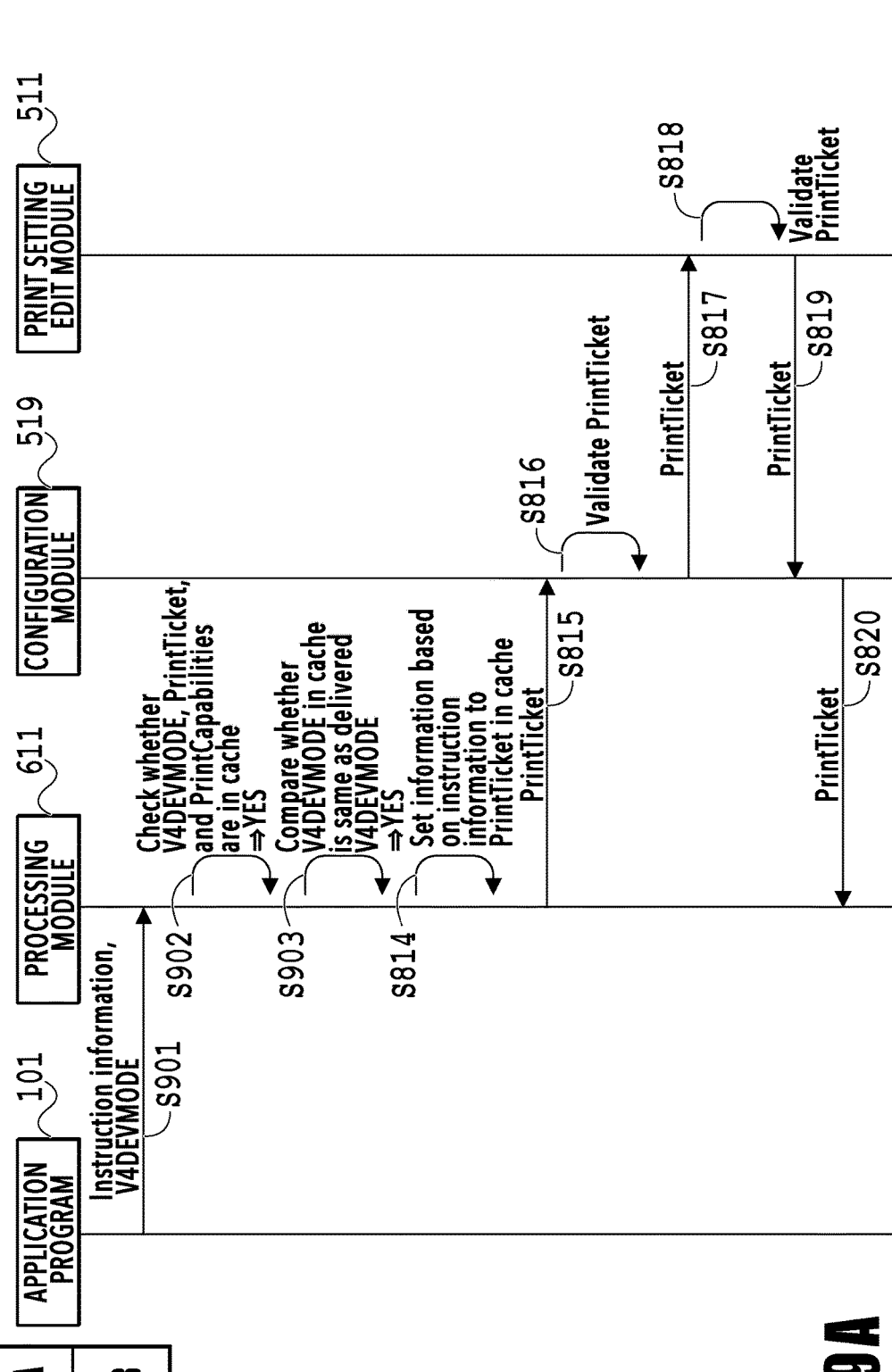

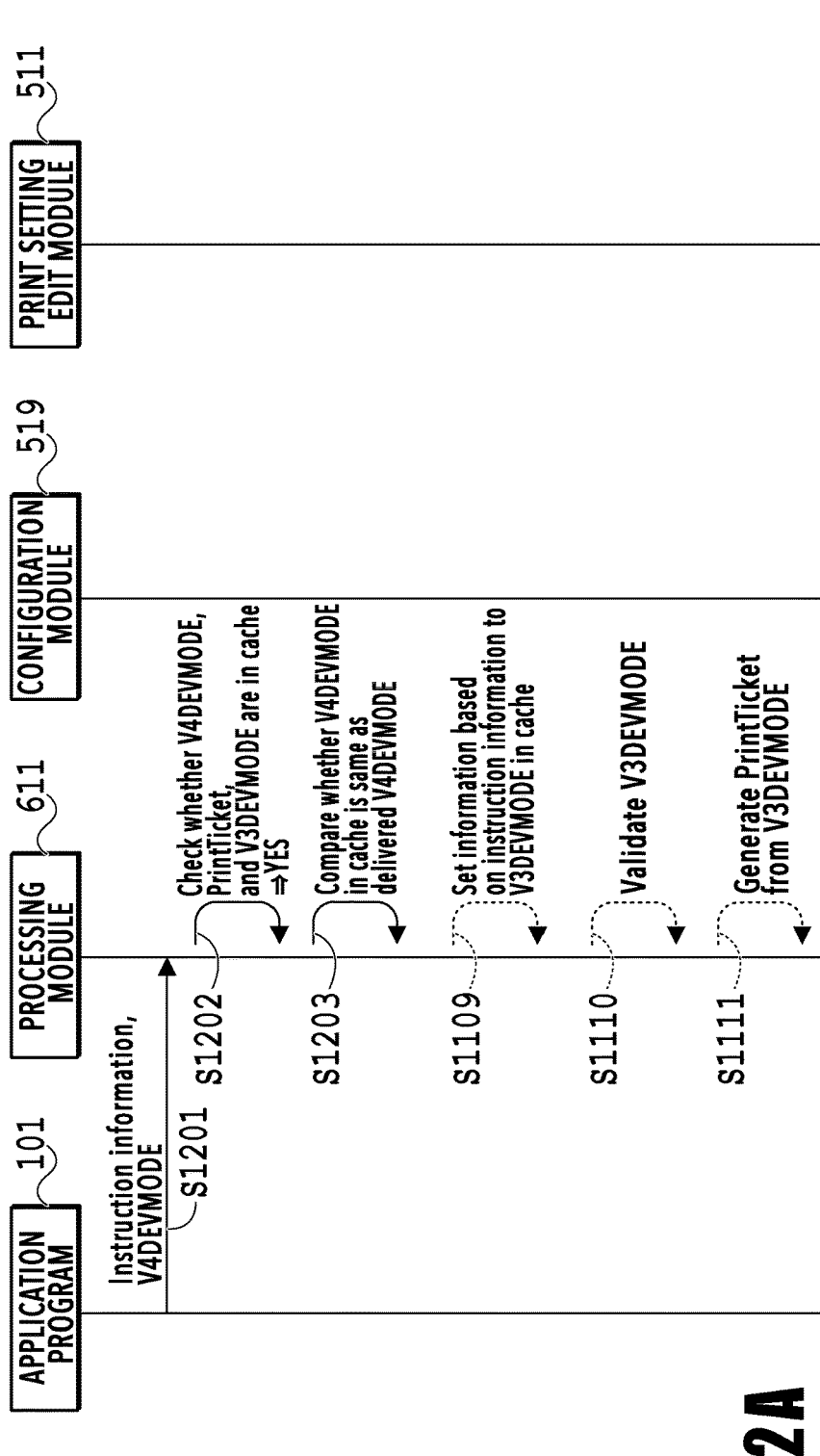

DATA COMMUNICATION METHOD AND INFORMATION PROCESSING APPARATUS HAVING MULTIPLE PRINT SETTINGS

BACKGROUND OF THE INVENTION

Field of the Invention

The present invention relates to a technique for communicating data concerning print settings between an application program and a printer driver.

Description of the Related Art

In general, in a case where printing is executed by an application program, various print settings are referred to or changed through a print setting screen provided by a printer driver. Meanwhile, among various application programs, there is an application program designed to refer to or change print settings on its own without using a print setting screen provided by a printer driver. Suppose an application program for printing postcards, for instance. If the application program uses the print setting screen provided by the printer driver, a user is allowed to select "A4 size", for example, as a sheet size instead of "postcards". This may result in confusion of the user or unintentional printing. In this regard, the sheet size and the sheet type usable in the application program for printing postcards should preferably be limited to those related to the "postcards".

In order to perform such customized print settings, the application program generally uses an application programming interface (API) provided by an operating system (hereinafter abbreviated as OS). The application program obtains (refers to) or changes a variety of information concerning the printing with a printer via the API. In the Windows (registered trademark) environment, the application program obtains and changes the information concerning the printing with the printer by using an API called the ExtEscape function provided by the OS. The ExtEscape function is used for transferring customized data between the application program and the printer driver in order to perform the customized print settings, and the like.

In the meantime, there are two types of printer drivers that are based on the V3 architecture and run on Windows (registered trademark), namely, V3 GDI printer driver and V3 XPS printer driver.

Japanese Patent Laid-Open No. 2010-140281 discloses a technique for transferring data concerning print settings between an application program and a printer driver by use of the ExtEscape function, which is adaptable to various OS environments and printer drivers.

SUMMARY OF THE INVENTION

A printer driver that runs on new architecture in the Windows (registered trademark) environment, called V4 printer driver, has been put into use in recent years. Such a V4 printer driver cannot use the ExtEscape function that has been traditionally employed by the V3 GDI printer driver and the V3 XPS printer driver. Hence, a printer driver like the V4 printer driver that cannot use the ExtEscape function faces a problem that an application program and this printer driver cannot transfer data concerning the customized print settings.

A method according to an aspect of the present invention provides a method of communicating data concerning a print setting between an application program designed to run on an operating system and a printer driver based on V4 architecture. In a case where the method is performed by a computer, the method includes the steps of: receiving a request instruction from the application, the request instruction including first print setting information retained by the application, and a demand for prescribed processing concerning the print setting; transmitting an instruction to an information generation component provided by the operating system to generate second print setting information from the received first print setting information, the second print setting information being formed in a data structure processible in the printer driver; receiving the second print setting information generated in response to the instruction; executing the prescribed processing based on the received second print setting information; and returning a result of the prescribed processing to the application.

Further features of the present invention will become apparent from the following description of exemplary embodiments with reference to the attached drawings.

BRIEF DESCRIPTION OF THE DRAWINGS

FIG. 8 is a diagram showing the relationship of FIGS. 8A and 8B;

FIGS. 8A and 8B are an exemplary sequence diagram of information setting processing;

FIG. 9 is a diagram showing the relationship of FIGS. 9A and 9B;

FIGS. 9A and 9B show an example of speeded-up system processing;

FIG. 11 is a diagram showing the relationship of FIGS. 11A and 11B;

FIG. 12 is a diagram showing the relationship of FIGS. 12A and 12B;

FIGS. 12A and 12B show another example of the speeded-up system processing; and

DESCRIPTION OF THE EMBODIMENTS

Figure 1:
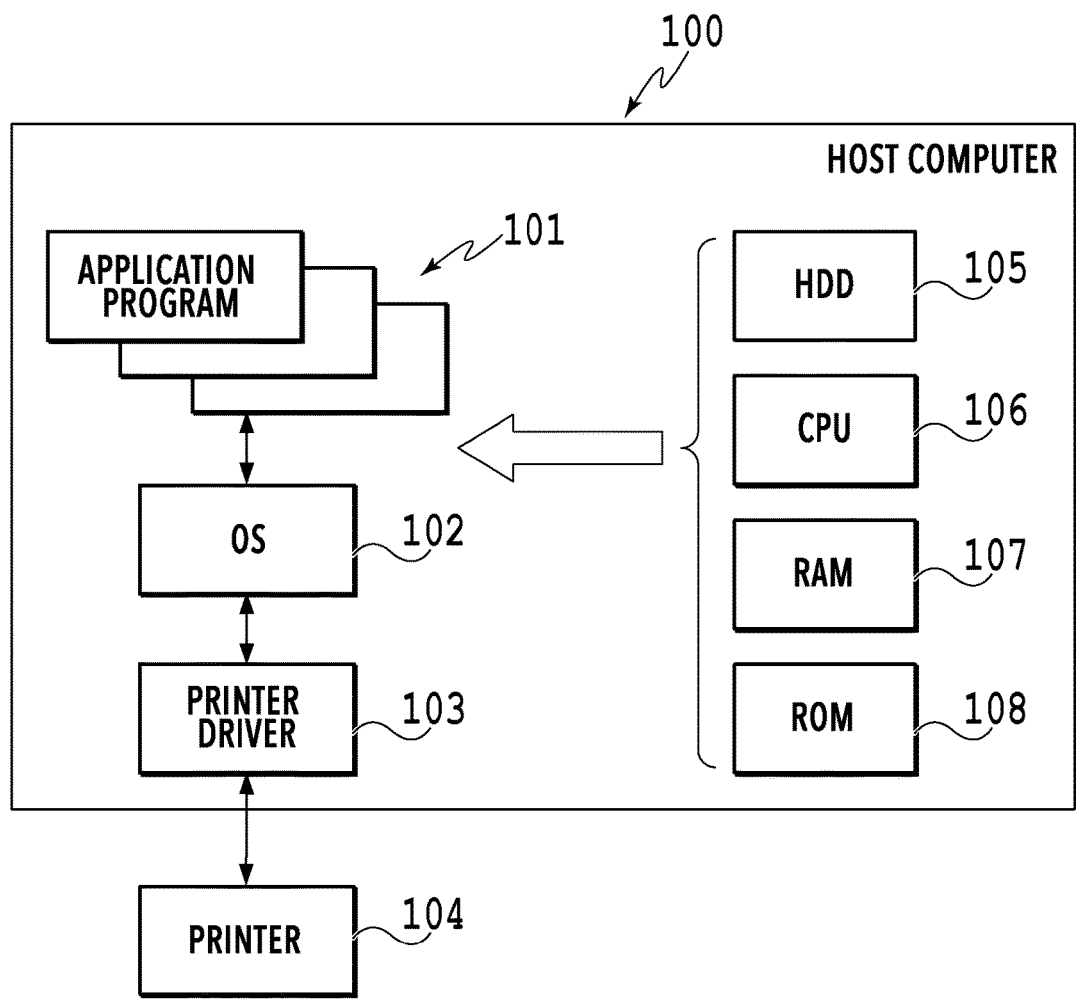
FIG. 1 is a block diagram showing a system configuration example.

Preferred embodiments of the present invention will be described below in detail with reference to the accompanying drawings. It is to be noted that the following embodiments do not intend to limit the scope of the present invention to be defined in the appended claims, and that the entire combination of the features described in each embodiment is not necessarily required for a solution by the present invention. In the description, the same constituents will be denoted by the same reference numerals.

<<First Embodiment>>
<System Configuration Example>

FIG. 1 is a diagram showing a system configuration example of this embodiment. A printer 104 such as an inkjet printer is connected to a host computer 100 serving as an information processing apparatus.

The host computer 100 stores application programs 101 for implementing a word processor, a spreadsheet, an Internet browser, a postcard printing application, and the like. Each application program 101 is software that runs on an operating system. In a case of performing printing, a group of various drawing processing instructions representing an outputted image, which are issued by the relevant application program 101, are inputted to a printer driver 103 via an operating system (OS) 102. The group of drawing instructions are formed from an image-drawing instruction, a text-drawing instruction, and a graphics-drawing instruction, for example. The printer driver 103 is software which generates print data by processing the group of drawing instructions, and causes a printer 104 to print the print data.

On the host computer 100, the above-mentioned software is stored in an HDD 105 or a ROM 108, read out to a RAM 107, and executed by a CPU 106. In this embodiment, a prevalent personal computer is assumed to be used as the host computer 100 shown in FIG. 1, and Windows (registered trademark) is assumed to be used as the OS 102. Moreover, this embodiment supposes an aspect of installing an appropriate application program 101 provided with a printing function on the aforementioned personal computer while connecting the printer 104 thereto.

In the host computer 100, outputted image data is generated by the application program 101. The outputted image data includes: text data classified into texts such as characters; graphics data classified into graphics such as figures; and picture image data classified into photographic and other images; and the like. In the case of printing an image based on the outputted image data, the application program 101 sends the OS 102 a print output request, and issues the groups of drawing instructions to the OS 102. In the group of drawing instructions, a text data part is composed of the text-drawing instruction, a graphics data part is composed of the graphics-drawing instruction, and a picture image data part is composed of the image-drawing instruction.

Upon receipt of the print output request from the application program 101, the OS 102 delivers the print output request to the printer driver 103 together with the group of drawing instructions received from the application program 101. The printer driver 103 processes the print output request and the group of drawing instructions delivered from the OS 102, thereby generating the print data with which the printer 104 can perform print processing. The printer driver 103 sends the print data to the printer 104. In other words, the print data is transmitted from the host computer 100 to the printer 104. The host computer 100 is connected to the printer 104 by using an interface such as Universal Serial Bus (USB), which can perform bidirectional communication.

<Configuration of V3 Printer Driver>

Figure 2:
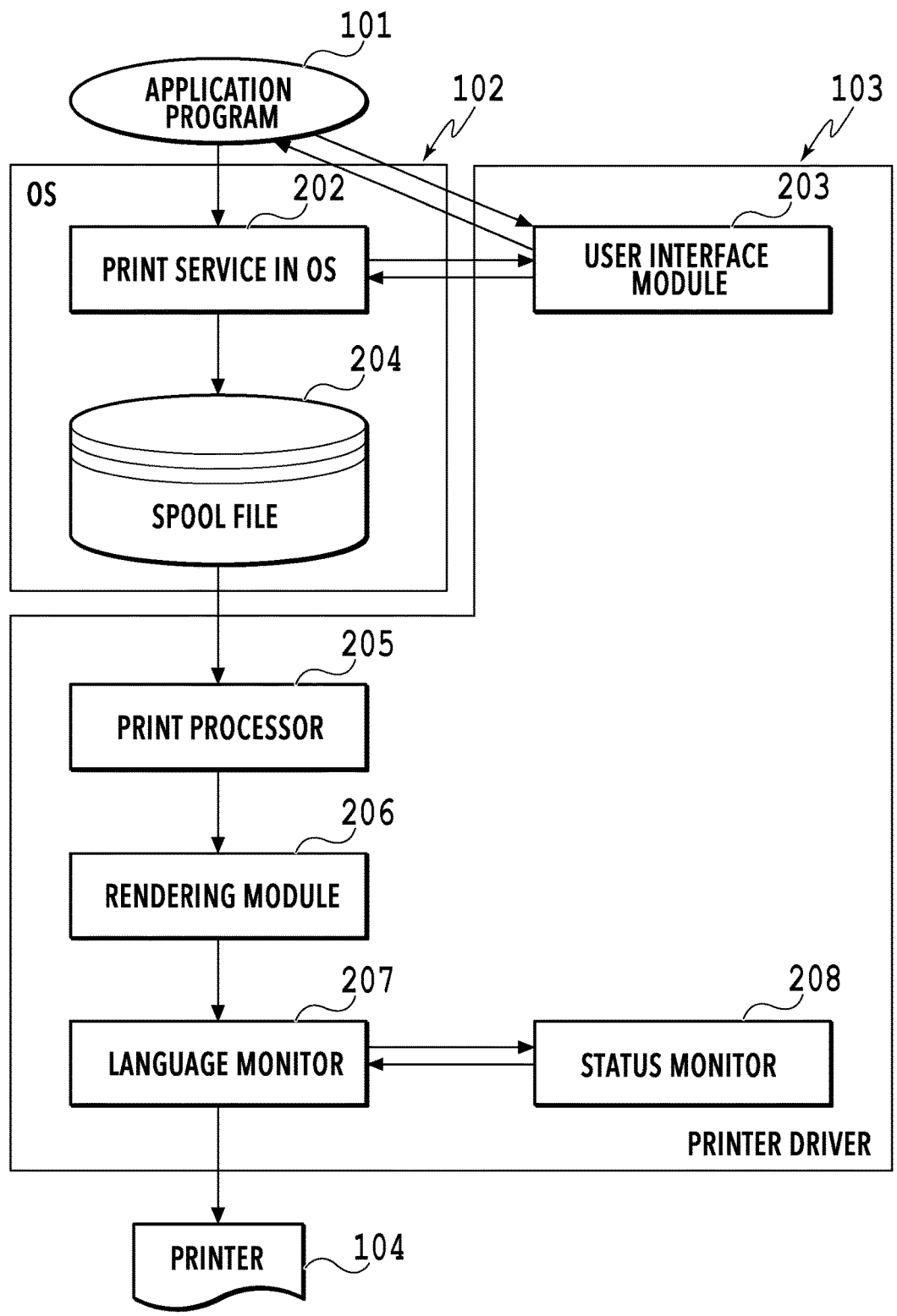
FIG. 2 is a block diagram showing a configuration of a V3 GDI printer driver.
Figure 3:
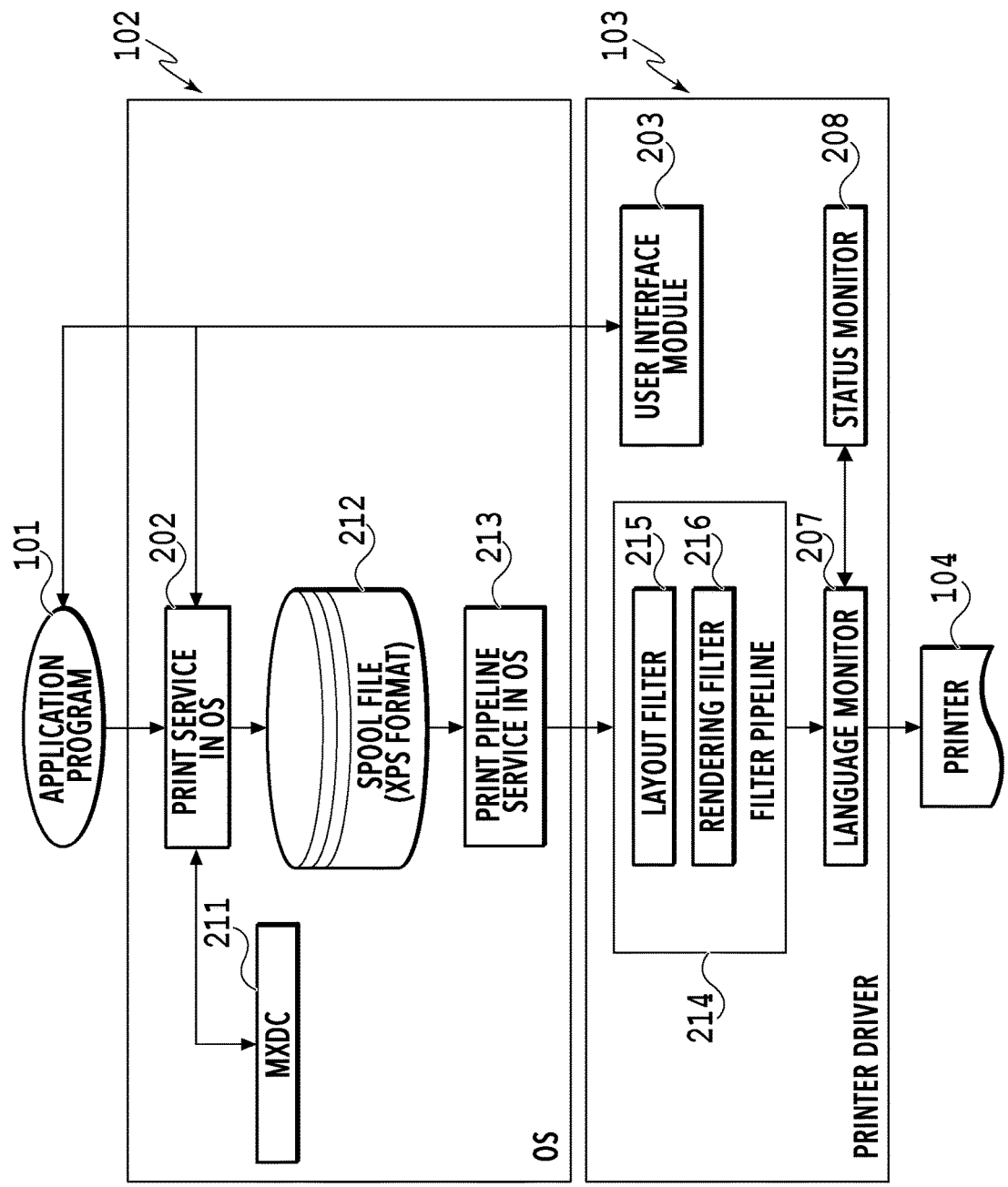
FIG. 3 is a block diagram showing a configuration of a V3 XPS printer driver.

FIGS. 2 and 3 are block diagrams showing configurations of software (mainly printer drivers) for a printing system in the case of using V3 printer drivers. In order to facilitate the understanding, a description will be given first of the V3 printer drivers and then another description will be given of a V4 printer driver.

FIG. 2 is a diagram including a configuration of a V3-based GDI printer driver (hereinafter referred to as a "V3 GDI printer driver"). FIG. 3 is a diagram including a configuration of a V3-based XPS printer driver (hereinafter referred to as a "V3 XPS printer driver").

The configuration of the V3 GDI printer driver shown in FIG. 2 will be described to begin with. The printer driver 103 includes a user interface module 203, a print processor 205, a rendering module 206, a language monitor 207, and a status monitor 208.

The application program 101 calls the user interface module 203 through a print service 202 in the OS, thus allowing a user to perform various settings concerning the printing.

The application program 101 generates a document and inquires of the user interface module 203 about a function of a printer system in order to print the document. Thereafter, the application program 101 notifies the printing system including the print service 202 in the OS of a start of printing. Upon receipt of the notification of the start of printing from the application program 101, print service 202 in the OS notifies the user interface module 203 in the printer driver 103 of a printing event to start the printing by the application program 101. The application program 101 supplies the print data of the document to be printed to the print service 202 in the OS and continues the print processing. The print data passed through the print service 202 in the OS is stored in a spool file 204.

The print processor 205 in the printer driver 103 reads the print data out of the spool file 204 of the OS 102. The print data thus read out is passed through the rendering module 206 and then sent to the language monitor 207. The language monitor 207 transmits the print data to the printer 104 while performing the bidirectional communication with the printer 104. The language monitor 207 receives information on a status held by the printer 104 as needed. Meanwhile, the language monitor 207 informs the status monitor 208 of a printer and printing situations currently effective based on the print data and the information received from the printer 104. The status monitor 208 not only displays the printer and printing conditions but also presents handling options to the user in a case where the printing is suspended for some reason. The status monitor 208 receives an input from the user in response thereto, and transmits the response to the language monitor 207.

Next, the configuration of the V3 XPS printer driver shown in FIG. 3 will be described. The printer driver 103 includes the user interface module 203, a filter pipeline 214, the language monitor 207, and the status monitor 208. The filter pipeline 214 includes a layout filter 215 and a rendering filter 216.

In the V3 XPS printer driver as well, the application program 101 calls the user interface module 203 through the print service 202 in the OS, thus allowing the user to perform various settings concerning the printing. In the application program 101, if a print instruction is inputted by way of a user operation, details of the instruction are sent from the application program 101 to the print service 202 in the OS. Specifically, the print service 202 in the OS generates a device context (DC) representing a virtual print area, and supplies the DC to the application program 101. The application program 101 performs drawing processing of document data on the DC. The drawing contents are converted into an XPS format by a Microsoft XPS document converter (MXDC) 211. As a consequence, the print data in the XPS format is generated. The print service 202 in the OS temporarily spools the print data in the XPS format for each print job into a storage device as a spool file 212. Here, if the application program is capable of generating an electronic document in the XPS format, then the application program can also spool the print data in the XPS format without performing the conversion processing with the MXDC 211.

The data stored in the spool file 212 is supplied to the filter pipeline 214 called by a print pipeline service 213 in the OS. The filter pipeline 214 is formed from a given number of filters described in a pipeline configuration file (not shown) of the V3 XPS printer driver. If a print command interpretable by the printer 104 is not in the XPS format, then at least a filter for converting the spooled data in the XPS format into an appropriate print command needs to be provided. In FIG. 3, the filter pipeline 214 is designed to include the layout filter 215 and the rendering filter 216. The layout filter 215 obtains the print data in the XPS format from the spool file, then edits the print data as appropriate based on the print settings, and outputs the edited print data. In other words, the layout filter 215 has functions to perform page layout processing based on print setting information while using the XPS document stored in the spool file 212 as an input, and to output the XPS data after undergoing the layout processing. The layout processing includes layout printing to print multiple pages on a single sheet surface, and poster printing to print a single page on multiple sheet surfaces, for example. If there is no need to process the print data, the layout filter 215 outputs the obtained print data without change.

The output from the layout filter 215 is supplied to the rendering filter 216. The rendering filter 216 performs rendering processing on each page of the supplied print data in the XPS format and performs necessary image processing as well. Then, the rendering filter 216 converts the data into the print command and outputs the converted print command. The print command outputted from the rendering filter 216 is sent to the language monitor 207. The language monitor 207 transmits the print data to the printer 104 while performing the bidirectional communication with the printer 104. Then, the printer 104 executes a printing operation.

<Explanation of ExtEscape Function>

Next, a description will be given of a method of transferring customized data concerning the print settings (a data communication method) between the application program 101 and any of the V3 GDI printer driver and the V3 XPS printer driver by using the ExtEscape function. A possible situation calling for this method is a case where the application program 101 is a postcard printing program, for example. This application program 101 obtains media information on the printer 104 from the printer driver 103, and displays a print setting screen customized for the application program 101 by using the obtained media information. As mentioned above, the reason why the application program 101 obtains the customized data is to perform the print settings and the like that are unique to the application program 101, or in other words, to display a print setting screen customized for the application program 101 instead of displaying a print setting screen provided by the printer driver. Here, the application program 101 may obtain the media information as the customized data and provide a print setting screen that validates only the desired media (such as "postcards") out of the obtained media information. Alternatively, in the case where the application program 101 requests the customized data from the printer driver 103, the application program 101 may request the media information only on the "postcards". The transfer of the customized data concerning the print settings as described above is conducted by using the ExtEscape function in the case of the V3 printer drivers.

Figure 4:
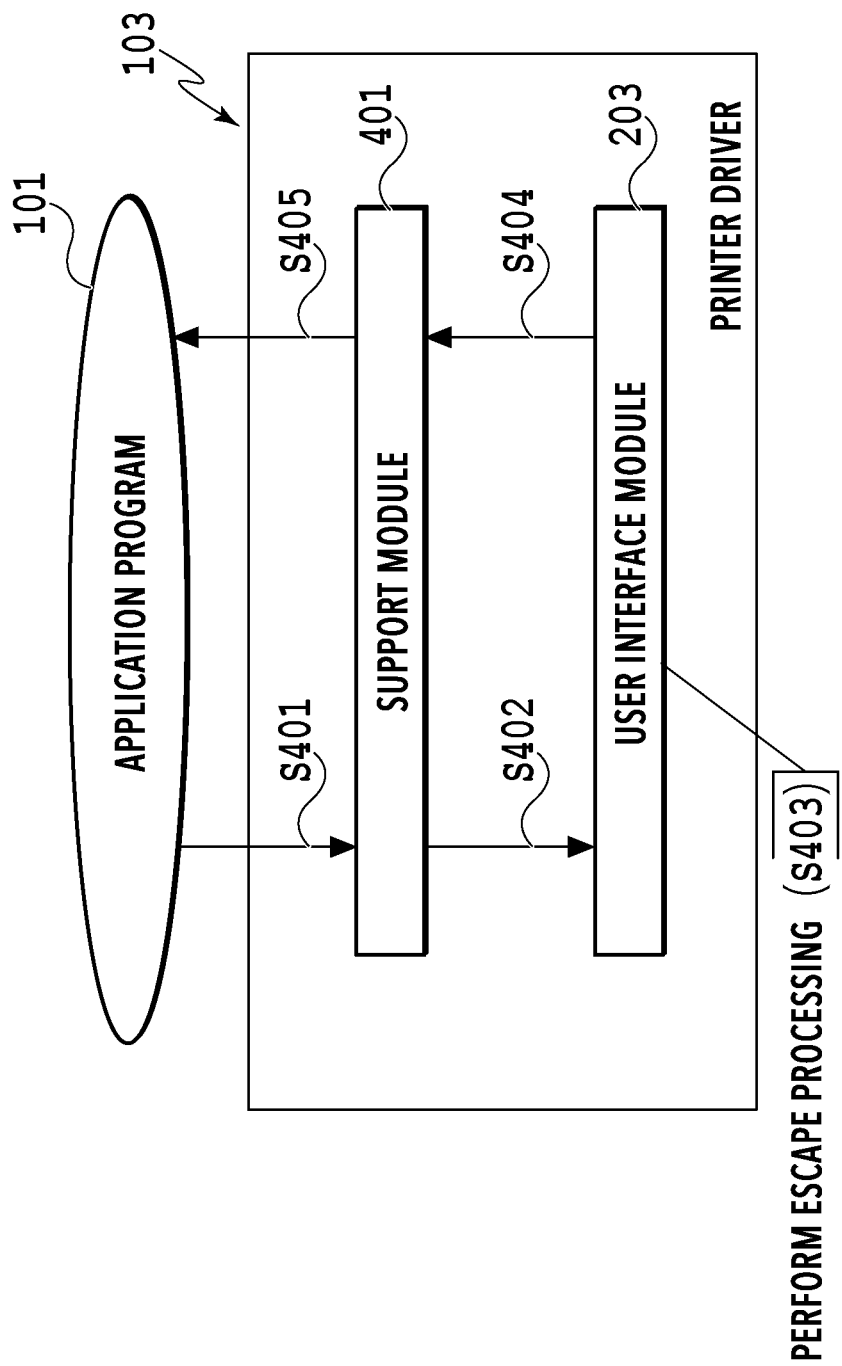
FIG. 4 is a configuration diagram of a system which transfers customized data to and from a V3 printer driver.

FIG. 4 is a diagram showing a system configuration that enables the transfer of the customized data between the application program 101 and either the V3 GDI printer driver or the V3 XPS printer driver. A printer vendor provides a support module 401 as part of the printer driver 103. The support module 401 is a module for enabling an application vendor to transfer the customized data to and from the printer driver 103.

The data transfer will be described with reference to FIG. 4. First, the application program 101 calls the support module 401 prepared by the printer vendor (S401). The support module 401 performs processing to call the ExtEscape function on behalf of the application program 101. In addition, the support module 401 monitors completion of processing by the user interface module 203 called by the ExtEscape function. The support module 401 does not directly transfer the data to and from the user interface module 203, but instead transfers the data to and from the user interface module 203 via the OS (by using the structure of the OS).

In the case where the application program 101 calls the support module 401, the application program 101 delivers an Escape code unique to the printer vendor as a parameter. The Escape code is provided to the application vendor and is built in the application program 101 in advance. The Escape code is used for allowing the support module 401 to obtain information concerning support functions of the printer driver or for calling a function to execute the printing, for example. In the meantime, the application program 101 transfers to the support module 401 necessary information for performing processing (Escape processing) that corresponds to the Escape code unique to the vendor. The necessary information includes, for example, specific instruction information such as a demand for the support media information concerning the printer driver, and the current print setting information on the printer driver. The print setting information is described in accordance with a data structure called DEVMODE. The print setting information in the case of using any of the V3 printer drivers will be hereinafter referred to as V3DEVMODE. As described above, the application program 101 calls the support module 401 and delivers the Escape code, the specific instruction information, and the V3DEVMODE as the parameters.

Next, the called support module 401 calls the ExtEscape function (S402). In this instance, the support module 401 forwards the Escape code, the specific instruction information, and the V3DEVMODE delivered from the application program 101. As the support module 401 calls the ExtEscape function, the DrvDocumentEvent function of the user interface module 203 in the printer driver is called via the OS. The DrvDocumentEvent function can refer to the parameters that are effective in the case where the support module 401 calls the ExtEscape function.

The user interface module 203 performs processing in response to the Escape code unique to the vendor and the information delivered as the parameters (S403). In this case, the user interface module 203 performs the processing based on specific instruction information delivered as the parameter. The specific instruction information includes an instruction to refer to information, such as an instruction to obtain the information on the media set in the current print settings, and an instruction to obtain a list of sizes supported by the printer driver. Meanwhile, the specific instruction information also includes an instruction to change a print setting.

A specific example will now be described. In the case where the specific instruction information is the instruction "to obtain the information on the media set in the current print settings", the user interface module 203 obtains the currently set media information from the V3DEVMODE delivered as the parameter. The following are two reasons why the user interface module 203 obtains the information on the current print settings from the print setting information (the V3DEVMODE) delivered from the application program 101.

The first reason is that the V3DEVMODE held by the application program 101 may be different from that held by the printer driver 103. For example, there may be a case where the sheet size has been changed from A4 to L on the application program 101 but the change is yet to be conveyed from the application program 101 to the printer driver 103. If the V3DEVMODE held by the printer driver is used in this situation, the V3DEVMODE with the sheet size set to "A4" will be returned. This is why the user interface module 203 obtains the currently set media information from the V3DEVMODE delivered as the parameter.

The second reason is that the application program 101 cannot learn about part of the details of the V3DEVMODE. The V3DEVMODE includes an OS standard print setting information section and a print setting information section to be defined by the printer vendor on its own. Of these sections, the application program 101 cannot single-handedly learn about the details of the print setting information section defined by the printer vendor on its own. For this reason, the V3DEVMODE is sent to the printer driver 103 so as to cause the user interface module 203 in the printer driver 103 to perform the processing to obtain the information therefrom.

In the case where the specific instruction is an instruction to obtain the list of sizes supported by the printer driver, the user interface module 203 obtains the list of supported sizes from a database that retains the support information on the printer driver.

On the other hand, in the case where the specific instruction is an instruction to set the media information in the print settings to photo paper, the user interface module 203 sets the photo paper to the media information in the V3DEVMODE. Then, the user interface module 203 checks whether or not the settings contain any mismatch. If there is a mismatch, the user interface module 203 performs validation processing in order to change the mismatch into an appropriate setting.

After having performed the above-described Escape processing, the user interface module 203 generates reply data as appropriate and returns a result of the processing and the reply data to the support module 401 via the OS (S404). Then, the support module 401 returns the result of the processing and the reply data to the application program 101 (S405). These are the fundamentals of the processing to transfer the customized data between the application program and either the V3 GDI printer driver or the V3 XPS printer driver by using the ExtEscape function.

However, the V4 printer driver cannot use the ExtEscape function because its specifications have been changed. In other words, the V4 printer driver lacks a feature to use the ExtEscape function. For this reason, the above-described processing is not applicable. In the following, a description will be given of an aspect of transferring the customized data between the application program 101 and the V4 printer driver based on the architecture for the V4 printer driver.

<Configuration of V4 Printer Driver>

Figure 5:
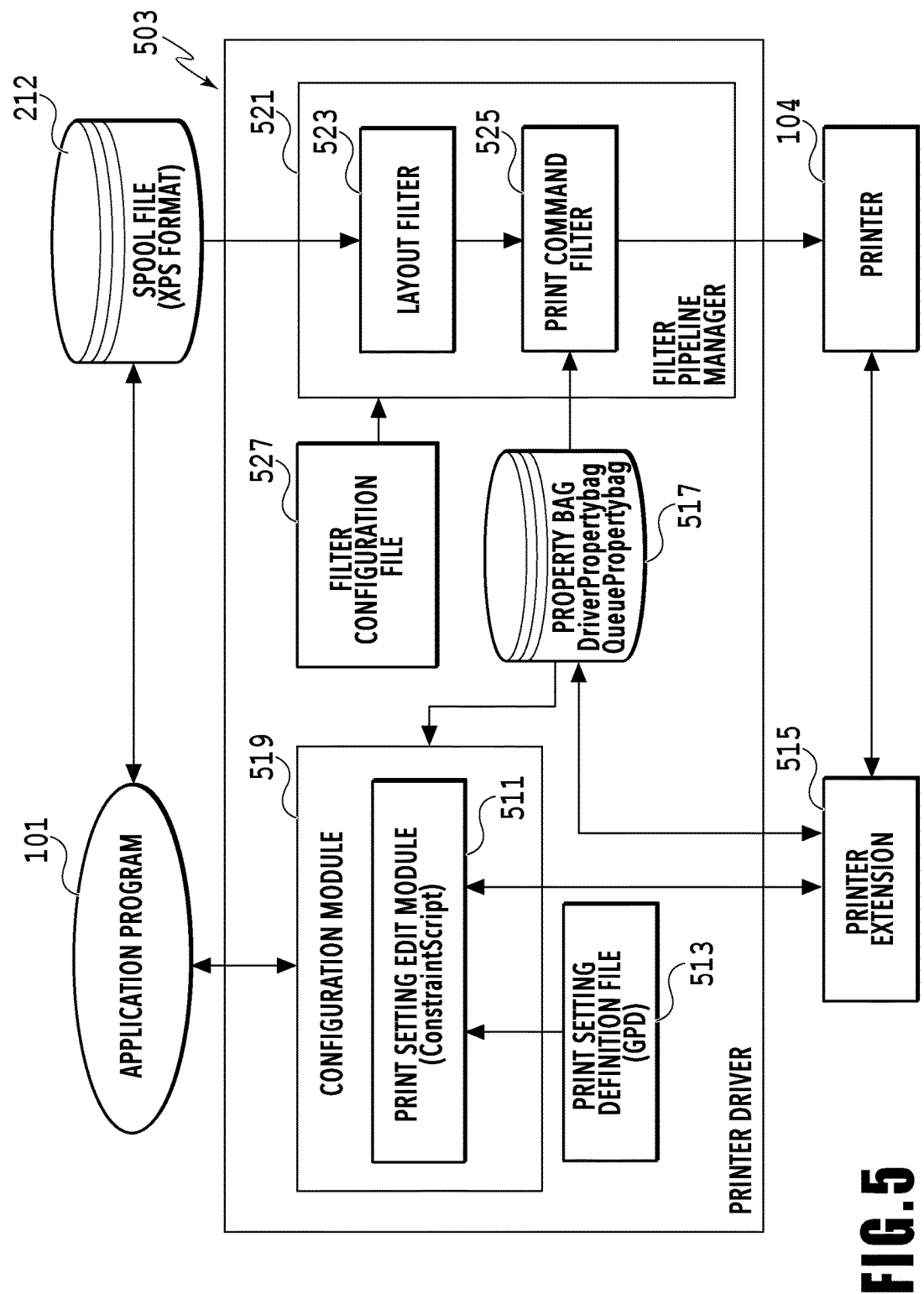
FIG. 5 is a block configuration diagram of a printing system involving a V4 printer driver.

A configuration of a printing system involving the V4 printer driver will be described to begin with. FIG. 5 is s a block configuration diagram of the printing system involving the V4 printer driver. To be more precise, FIG. 5 is the block configuration diagram of the printing system involving the V4 printer driver in the state after the host computer 100 has installed the V4 printer driver.

The printing system using the V4 printer driver performs printing while using an XPS file format as spool data. Such a printer driver 503 includes a configuration module 519, a print setting definition file 513, a filter pipeline manager 521, and a filter configuration file 527.

Note that FIG. 5 illustrates the case where the configuration module 519 and the filter pipeline manager 521 are included in the configuration of the printer driver 503. However, these components are modules of the printer driver 503 provided by the OS of the host computer 100 and are not the modules unique to the vendor. Accordingly, these modules are not included in a package used for installing the printer driver. In the case where the printer driver 503 is installed, these modules are provided by the OS and incorporated in the configuration of the printer driver 503. In other words, since the driver does not have a configuration module of its own in the case of the V4 printer driver, the configuration module 519 being the component of the OS is used as the configuration module of the driver.

The configuration module 519 generates PrintTicket or PrintCapabilities based on the print setting definition file 513. The PrintTicket is data which is defined by a data structure different from the DEVMODE and retains the print settings as with the DEVMODE. The PrintTicket retains the setting information indicating that the current media setting is photo paper and the current sheet size setting is L, for example. The PrintCapabilities is a data structure that retains information on printing capabilities of the printer driver 503 (the printer 104). The PrintCapabilities retains the setting information (available list information) indicating that the media that can be handled by the printer driver 503 include plain paper, photo paper, and postcards and that the sheet sizes that can be handled include A4, Letter, L, and postcards, for example.

The print setting definition file 513 is a text-based description file called Generic Printer Description (GPD). Moreover, "word wrapping" definitions can be written into the print setting definition file 513. For example, it is possible to provide the user with a word wrapping function by writing set values of the print settings that cannot be set up simultaneously into an item InvalidCombination based on a description method defined by Microsoft (registered trademark).

Meanwhile, the configuration module 519 can edit the print setting information by using a print setting edit module 511 which is provided by the printer driver 503 (i.e. the printer vendor). The print setting edit module 511 is a module written in JavaScript (registered trademark), which is called ConstraintScript. The configuration module 519 generates only the OS standard print setting information section, but cannot generate the print setting information concerning functions not defined in the OS standard such as a stamp function and a color correction function. The above-mentioned print setting information concerning the functions not defined in the OS standard can be generated by preparing the print setting edit module 511 that the vendor can provide on its own. The print setting edit module 511 obtains information necessary for generating the print setting information concerning the functions not defined in the OS standard from a property bag 517, and generates the print setting information.

Data stored in the property bag 517 are provided by the printer driver 503. The property bag 517 represents an area that stores a data group called DriverPropertyBag to be used as machine-dependent information on the printer, and a data group called QueuePropertyBag associated with a print queue. The DriverPropertyBag will be hereinafter referred to as DPB while QueuePropertyBag will be hereinafter referred to as QPB. Both the DPB and the QPB are storage areas provided by the OS. The DPB is machine-dependent data of the printer present in a driver package, and the data group is retained as read-only data in a specific area in the OS after installing the printer driver 503. The QPB can be used by registering a key-value pair XML definition file with the OS, and is capable of editing the value within a given range of authority. Meanwhile, the definition of the QPB can also be written in the GPD which is the print setting definition file 513. Here, reference can be made to the property bag 517 also by a printer extension 515 and a print command filter 525.

The printer extension 515 is an application that provides a user interface unique to the vendor for allowing the user to perform the print setting by using the V4 printer driver. Although the printer extension 515 is separately illustrated in FIG. 5 for the convenience of explanation, it is to be noted that the printer extension 515 is one of the applications like the application program 101. In other words, the printer extension 515 does not constitute part of the printer driver 503. For this reason, the printer extension 515 cannot be used in the case of transferring customized data between the application program 101 and the printer driver 503 as described later. The printer extension 515 provides a function to allow setting of the size, a printing direction, and other attributes of a sheet used for the printing.

In the case where the application program 101 conducts the printing in the printing system shown in FIG. 5, the application program 101 generates the print setting information to begin with. Generally, the application program 101 calls the configuration module 519 in the printer driver 503. The configuration module 519 generates the print setting information and sends the print setting information to the application program 101. The application program 101 stores the generated print setting information. In the meantime, the application program 101 can use the printer extension 515 to generate the print setting information. Here, the printer extension 515 is not configured to provide the print settings customized for the application program 101, but is configured to provide the print settings available for the printer 104 in general. Accordingly, it is not possible to employ the printer extension 515 for usage such as providing a print setting that limits the sheet size to a particular sheet size (such as postcards), for example. In other words, the printer extension 515 cannot be used to transfer the customized data to and from the application program 101.

The application program 101 generally retains the print setting information in the form of the DEVMODE structure. Accordingly, the DEVMODE structured is used for transmitting the print setting information to and from the printer driver 503. On the other hand, the transmission of the print setting information within the V4-based printer driver 503 is performed by using a PrintTicket structure.

In the case where the print setting information is generated, the application program 101 subsequently generates the print data. The print data for each page of a document thus generated is temporarily stored in the XPS spool file 212 through a print support function of the OS. As the XPS spool file 212 is generated, the processing is passed on to the filter pipeline manager 521. The filter pipeline manager 521 adopts a mechanism designed to perform the printing by means of passage through multiple filters. Here, the filter configuration file 527 controls the number and the order of the filters. The group of filters in this embodiment includes a layout filter 523 serving as a layout processing component, and the print command filter 525 serving as a print command converter.

The layout filter 523 has functions to perform page layout processing based on the print setting information while using the XPS document stored in the XPS spool file 212 as an input, and to output the XPS data after the layout processing. The layout filter 523 receives the print setting information via the OS.

The print command filter 525 has functions to convert the XPS document into print commands interpretable by the printer 104 in accordance with the print setting information while using the output from the layout filter 523 as an input, and to output the converted print commands. In the case where the print command filter 525 once converts the inputted XPS document into image data, the print command filter 525 is generally called a rendering filter. Such a rendering filter is often observed in a printer driver for a low-price raster printer as typified by an inkjet printer. In the case where the print command filter 525 is operated as the rendering filter, the print command filter 525 once converts the inputted XPS document into the image data. Thereafter, the image data undergoes image processing such as color space conversion and binarization, and is thus converted into the print commands interpretable by the raster printer. In the case where the XPS is included in types of the print commands interpretable by a printer such as a high-performance printer as typified by a page printer, the print command filter 525 edits the inputted XPS document and outputs the edited XPS document. If there is no need to perform the processing with the print command filter 525, then the inputted XPS document may be outputted without change or the print command filter 525 does not have to be included in the printer driver 503.

The configuration of the printing system involving the V4 printer driver has been described above. As seen in the above description, the user interface module 203 playing the roll in the Escape processing in the V3 GDI printer driver and in the V3 XPS printer driver is not included in the configuration of the printing system involving the V4 printer driver. In the architecture involving the V4 printer driver, the printer extension 515 and the configuration module 519 correspond to modules substituting for the user interface module 203. However, the printer extension 515 does not constitute part of the printer driver 503 as mentioned previously. Moreover, the configuration module 519 does not support the ExtEscape function. Accordingly, if the customized data is transferred between the V4 printer driver and the application program, the above-described processing by using the ExtEscape function cannot achieve the transfer. In the following, a description will be given of a mode to enable the V4 printer driver to transfer the customized data to and from the application program.

<Transfer of Customized Data in V4 Architecture>

Figure 6:
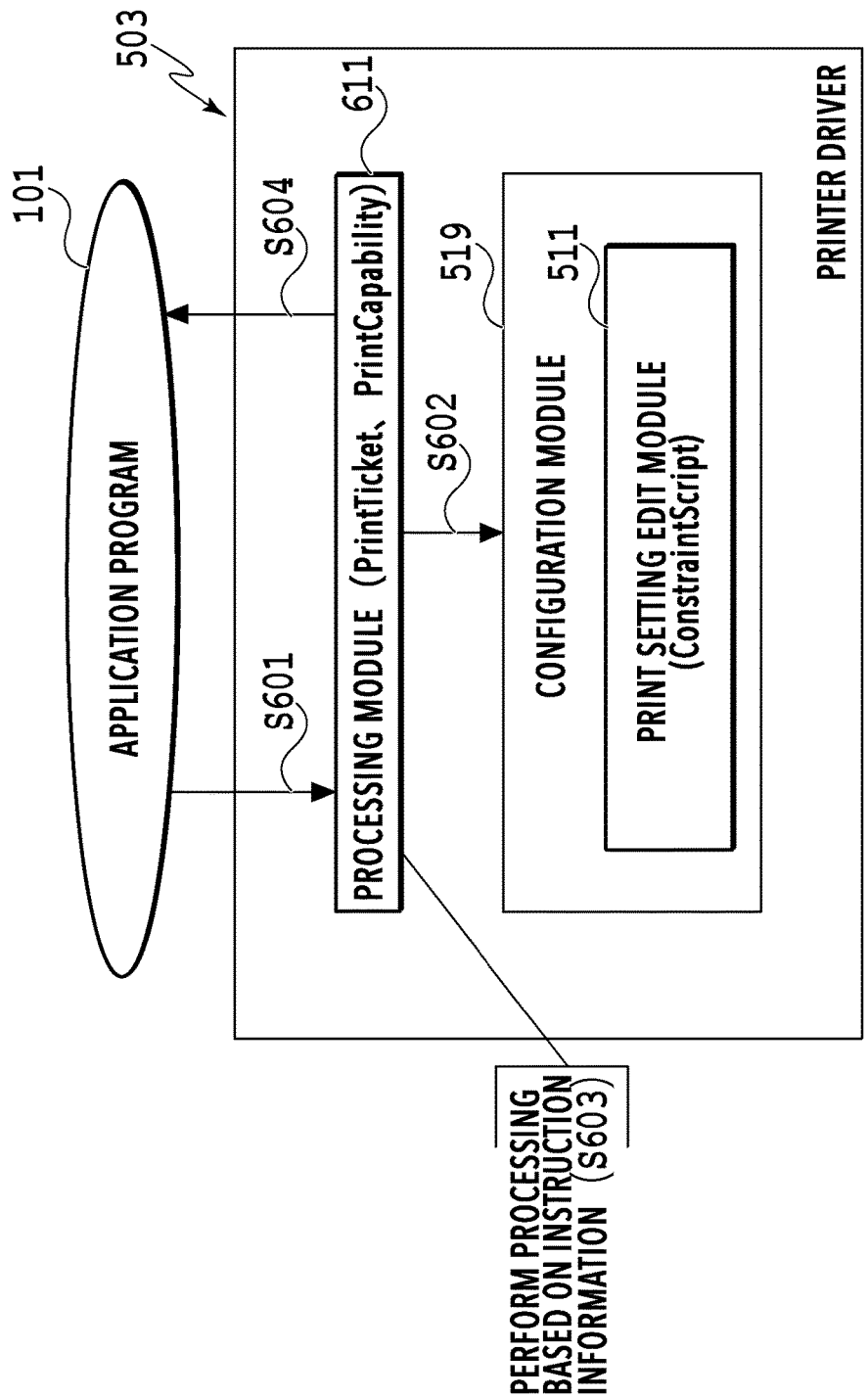
FIG. 6 is a configuration diagram of a system which transfers customized data to and from the V4 printer driver.

FIG. 6 illustrates a configuration of the system that enables the transfer of the customized data to and from the application program by using the V4 printer driver, and a flow of a series of processing by the system. Instead of the support module 401 in the system configuration adaptable to the V3 GDI printer driver or the V3 XPS printer driver, a processing module 611 is provided in the system configuration adaptable to the V4 printer driver. The processing module 611 receives the specific instruction information from the application program 101 such as a demand for the support media information concerning the printer driver, or receives the specific instruction information therefrom such as a demand for setting the size of the used sheet to "postcards", for instance. The processing module 611 performs the processing based on the specific instruction information by using the PrintTicket and the PrintCapabilities. Moreover, the processing module 611 plays a roll in returning a result of the processing to the application program 101. In other words, the processing module 611 receives a demand (a specific instruction) concerning the print settings from the application program 101, and performs the processing in accordance with the demand.

Specifically, the application program 101 calls the processing module 611 to begin with (S601). In this instance, the application program 101 delivers the specific instruction information (a demand for prescribed processing) such as the demand for the support media information concerning the printer driver, and the current print setting information on the printer driver. The print setting information is delivered in the form of a V3DEVMODE structure in the case where the printer driver is the V3 GDI printer driver or the V3 XPS printer driver. Meanwhile, if the printer driver is the V4 printer driver, the print setting is delivered in the form of V4DEVMODE which is different from the case of the V3 printer drivers. The V3DEVMODE and the V4DEVMODE are the same DEVMODE structure in terms of the data structure. However, the V3DEVMODE and the V4DEVMODE are different from each other in terms of a way to handle one of parameters called "private driver-specific data". In the V3DEVMODE, the printer vendor can generate the "private driver-specific data" on its own. On the other hand, in the V4DEVMODE, the OS generates the "private driver-specific data" whereas the printer vendor cannot generate the "private driver-specific data" on its own. In other words, in the V4DEVMODE, the printer vendor (i.e., the printer driver 503) cannot refer to the contents of the "private driver-specific data". This is the difference between the V3DEVMODE and the V4DEVMODE.

As described above, the application program 101 sends the processing module the demand for the prescribed processing and the V4DEVMODE (first print setting information) collectively as a request instruction. The processing module 611 called in step S601 delivers the V4DEVMODE received from the application program 101 to the configuration module 519. Then, the processing module 611 causes the configuration module 519 to generate the PrintTicket (second print setting information) and the PrintCapabilities (printing capability information) (S602). Specifically, the PrintTicket (a printing ticket) formed in the data structure processible in the V4 printer driver 503 is derived from the V4DEVMODE. Meanwhile, the printing capability information (a printing capability) used in the V4 architecture is derived from the PrintTicket. Details will be described later. Here, in the V4 printer driver in general, the data format handled as the print setting information is not the DEVMODE but the PrintTicket. On the other hand, the data handled by the application program 101 is generally the DEVMODE data structure. For this reason, the processing module 611 performs the processing to cause the configuration module 519 to generate the PrintTicket and the PrintCapabilities from the V4DEVMODE.

Next, the processing module 611 performs processing based on the specific instruction information sent from the application program 101 by using the PrintTicket and the PrintCapabilities generated as described above (S603). The specific instruction information is the information such as the demand for the support media information concerning the printer driver. Then, the processing module 611 returns a result of the processing to the application program 101 (S604). Now, the system configuration and the flow of the series of processing have been described above.

<Sequence of Information Reference Processing (Acquisition Processing)>

Figure 7:
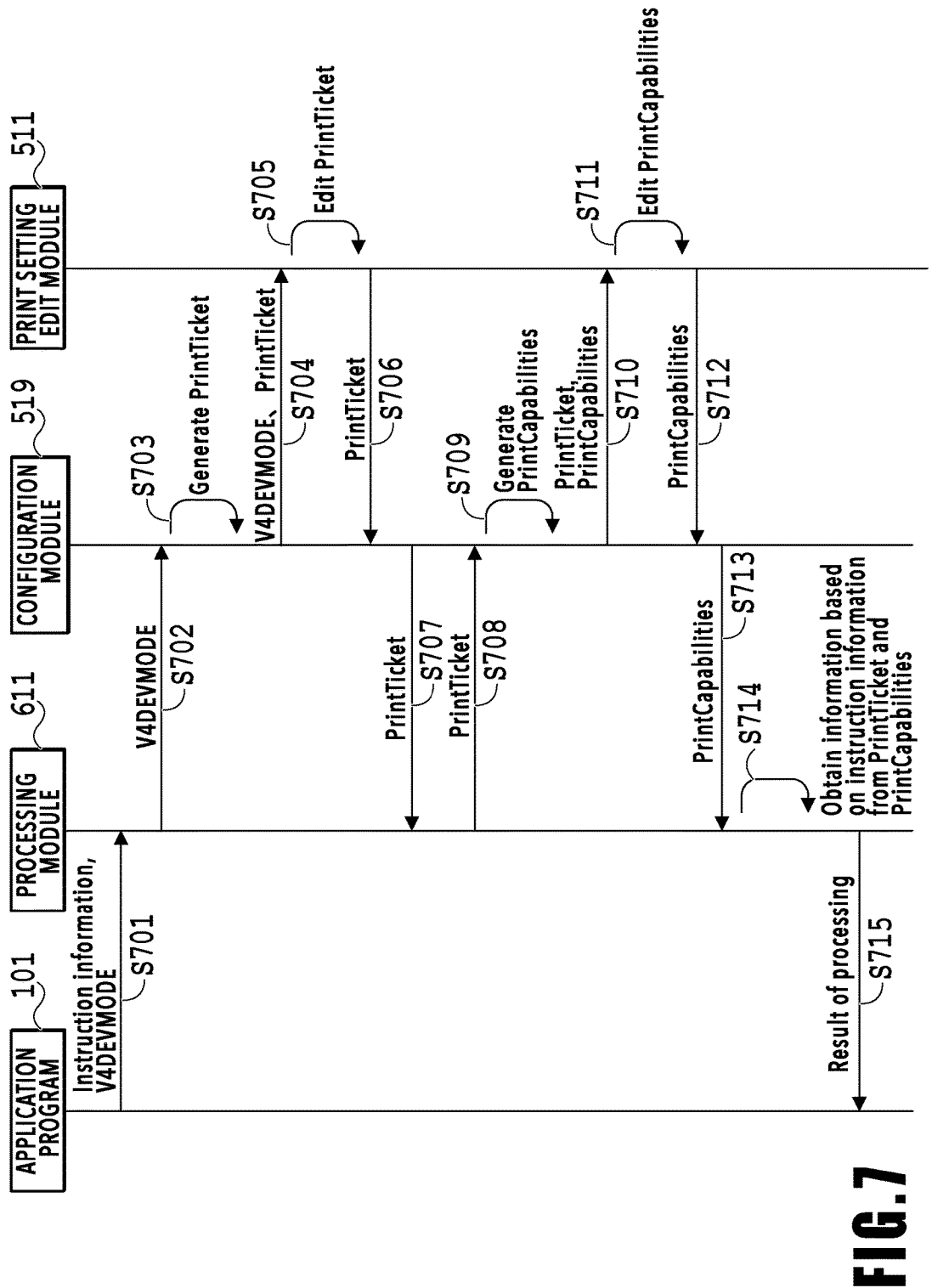
FIG. 7 is an exemplary sequence diagram of information reference processing.

A more detailed flow of the processing of the system will be described. FIG. 7 is a diagram showing a sequence of reference (acquisition) processing concerning information subjected to the print setting. First, the application program 101 calls the processing module 611 in step S701. In this instance, the application program 101 delivers the specific instruction information and the V4DEVMODE, which represents the current print setting information on the printer driver, to the processing module 611.

Next, in step S702, the processing module 611 delivers the V4DEVMODE to the configuration module 519 (an information generation component) so as to cause the configuration module 519 to generate the PrintTicket from the received V4DEVMODE. Specifically, the processing module 611 calls PTConvertDevModeToPrintTicket which is an API provided by the OS. The processing module 611 designates the received V4DEVMODE as a parameter thereof.

In step S703, upon receipt of the call from the API, the configuration module 519 generates the PrintTicket from the V4DEVMODE received as the parameter from the processing module 611. Here, the PrintTicket generated in step S703 represents a generated outcome of only the OS standard print setting information section. In other words, the print setting information section defined by the vendor on its own is not included in this PrintTicket.

In step S704, the configuration module 519 calls the print setting edit module 511 (an editing component) via the OS so as to cause the print setting edit module 511 to generate the print setting information section defined by the vendor on its own. Then, the configuration module 519 delivers the V4DEVMODE and the PrintTicket to the print setting edit module 511. Note that if the print setting edit module 511 is present and the print setting edit module 511 supports the PrintTicket generating API, the configuration module 519 is configured to automatically call the print setting edit module 511.

In step S705, the print setting edit module 511 edits the PrintTicket. Specifically, the print setting edit module 511 called by the configuration module 519 obtains (receives) the V4DEVMODE and the PrintTicket. Then, the print setting edit module 511 edits the PrintTicket based on the received information, and generates the print setting information section defined by the vendor on its own. The print setting edit module 511 is the module provided by the vendor and grasps which part of the print setting information section is incomplete. Hence, the print setting edit module 511 generates the incomplete print setting information section from the V4DEVMODE.

The print setting information (the PrintTicket) including the OS standard print setting information section and the print setting information section defined by the vendor on its own is formed accordingly. The generated PrintTicket is relayed through the configuration module 519 (S706) and is returned to the processing module 611 in step S707.

Next, the processing module 611 performs processing to cause the configuration module 519 to generate the PrintCapabilities from the PrintTicket. In step S708, the processing module 611 delivers (transmits) the PrintTicket received in step S707 to the configuration module 519. Specifically, the processing module 611 calls PTGetPrintCapabilities which is an API provided by the OS. The processing module 611 designates the PrintTicket as a parameter thereof. Subsequently, in step S709, the configuration module 519 generates the PrintCapabilities from the PrintTicket received as the parameter. The PrintCapabilities generated by the configuration module 519 only includes an OS standard printing capability information section. In other words, in the PrintCapabilities, a printing capability information section to be defined by the vendor on its own is not generated.

Accordingly, in step S710, the configuration module 519 calls the print setting edit module 511 so as to cause the print setting edit module 511 to edit the PrintCapabilities. In this instance, the configuration module 519 sends the print setting edit module 511 the PrintTicket and the generated PrintCapabilities.

In steps S711, the print setting edit module 511 edits the PrintCapabilities based on the received PrintTicket and PrintCapabilities, thereby generating the printing capability information section defined by the vendor on its own. The edited PrintCapabilities is relayed through the configuration module 519 (S712) and is returned to the processing module 611 in step S713.

In step S714, from the generated PrintTicket and PrintCapabilities information, the processing module 611 obtains information based on the instruction information received from the application program 101. For example, if the instruction information is the instruction to obtain the information on the media currently set in the print settings, the processing module 611 obtains the information on the set media from the PrintTicket. In the case where the instruction information is the instruction to obtain the list of sizes supported by the printer driver, the processing module 611 obtains the list of supported sizes from the PrintCapabilities. In step S715, the processing module 611 returns the obtained information as a result of the processing to the application program 101.

Note that the description has been given, with reference to FIG. 7, of the processing to generate the PrintTicket and the PrintCapabilities from the V4DEVMODE. Here, if the instruction information is the instruction to obtain the information on the media currently set in the print settings as mentioned earlier, then the processing module 611 only needs to obtain the set media information from the PrintTicket. In this case, the processing module 611 does not have to perform the PrintCapabilities processing explained in steps S708 to S713. As described above, the processing module 611 may switch between the processing to generate both the PrintTicket and PrintCapabilities and the processing to generate only the PrintTicket based on the specific instruction information.

<Sequence of Information Setting Processing>

Figure 8B:
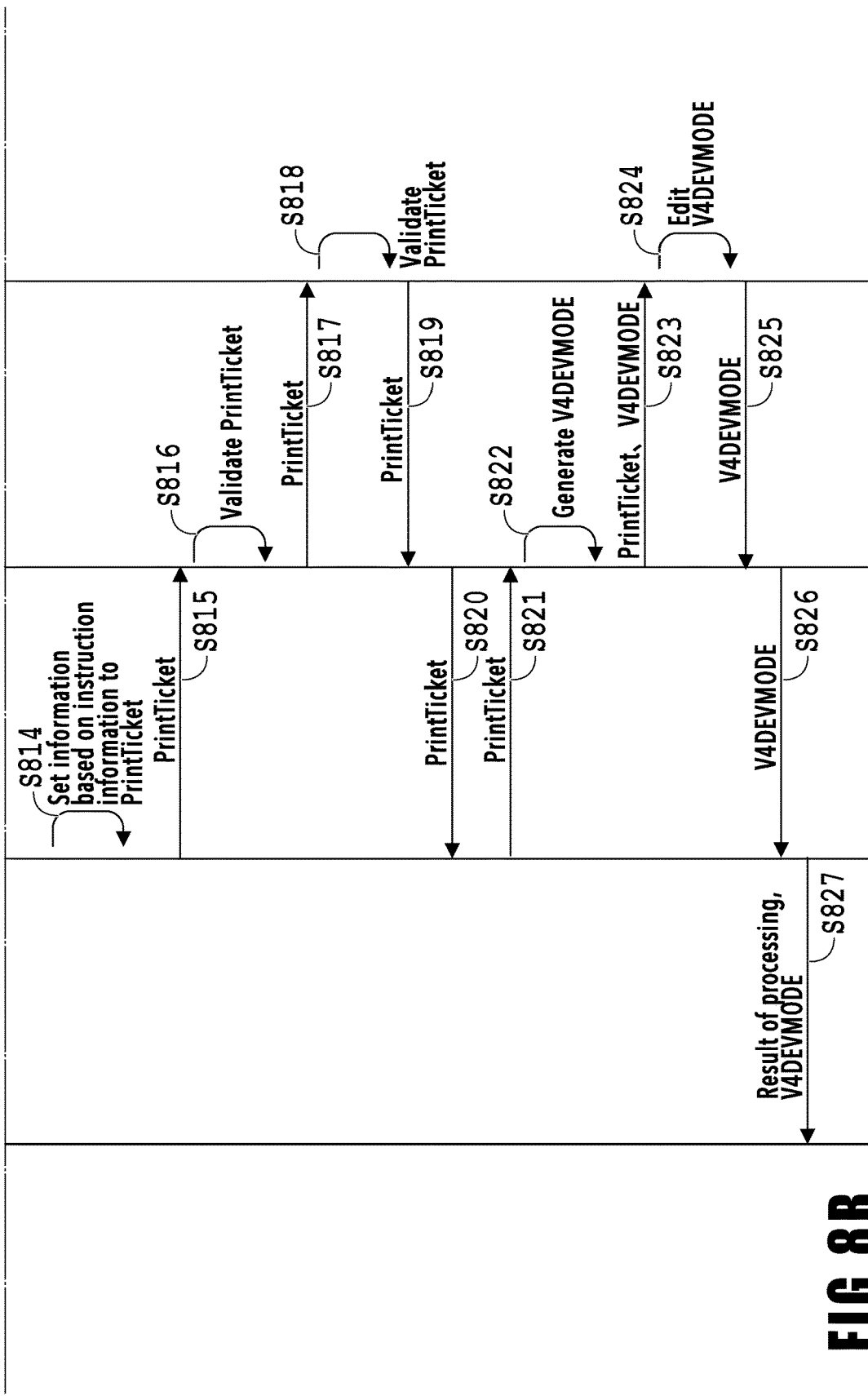

FIGS. 8A and 8B are diagrams showing an example of a sequence of information setting processing, which exemplifies a case where the instruction information from the application program 101 is the instruction to set the media information in the print settings to photo paper, for instance. Here, steps S701 to S713 are the same as those in FIG. 7 and explanations thereof will be omitted.

In step S814, the processing module 611 sets the information, which is based on the instruction information received in step S701, to the PrintTicket that is returned (generated) in step S707. For example, if the specific instruction information is the instruction to set the media information in the print settings to photo paper as mentioned above, the processing module 611 sets photo paper to the media information in the generated PrintTicket.

Next, in step S815, the processing module 611 delivers the PrintTicket to the configuration module 519 so as to cause the configuration module 519 to perform the validation processing on the PrintTicket to which the information is set. The validation processing is processing of validation by checking whether or not there is any mismatch in the settings and to change the mismatch, if there is one, to an appropriate setting. Specifically, the processing module 611 calls PTMergeAndVlidatePrintTicket which is an API provided by the OS. The PrintTicket is designated as a parameter thereof.

Thereafter, the configuration module 519 performs the validation processing on the received PrintTicket in step S816. The PrintTicket subjected to the validation processing in step S816 represents a validated outcome of only the OS standard print setting information section. In other words, the print setting information section defined by the vendor on its own and included in the PrintTicket is not validated. Accordingly, in step S817, the configuration module 519 calls the print setting edit module 511 so as to cause the print setting edit module 511 to perform the validation processing on the print setting information section to be defined by the vendor on its own and included in the PrintTicket. The PrintTicket subjected to the validation processing (S818) by the print setting edit module 511 is relayed through the configuration module 519 (S819) and is returned to the processing module 611 (S820).

As described previously, the application program 101 generally handles the print setting information in the form of the DEVMODE structure. Hence, processing to generate the V4DEVMODE from the PrintTicket subjected to the validation processing is carried out next. In step S821, the processing module 611 delivers the PrintTicket subjected to the validation processing to the configuration module 519. Specifically, the processing module 611 calls PTConvertPrintTicketToDevMode which is an API provided by the OS. The PrintTicket is designated as a parameter thereof.

Then, in step S822, the configuration module 519 generates the V4DEVMODE from the received PrintTicket. The V4DEVMODE generated in step S822 is the V4DEVMODE in which only the OS standard print setting information section is generated. Here, the print setting information section to be defined by the vendor on its own is not generated. Accordingly, in step S823, the configuration module 519 calls the print setting edit module 511 so as to cause the print setting edit module 511 to edit the V4DEVMODE. The called print setting edit module 511 receives the V4DEVMODE and the PrintTicket subjected to the validation processing. In step S824, the print setting edit module 511 edits the V4DEVMODE based on these pieces of information and generates the print setting information section defined by the vendor on its own. The V4DEVMODE thus edited is relayed through the configuration module 519 (S825) and is returned to the processing module 611 (S826). In step S827, the processing module 611 returns a result of the processing and the V4DEVMODE delivered in step S826 to the application program 101.

Note that in the processing of FIG. 8B, the validation processing is performed on the PrintTicket but not on the PrintCapabilities. The PrintCapabilities is the information on the capabilities of the printer driver, which is the information including the list of the supported media, the list of the supported sizes, and so forth. These pieces of information are not changed depending on the contents of settings in the print settings. This is why the validation processing is not performed on the PrintCapabilities.

The details of the system capable of transferring the customized data to and from the application program while involving the V4 printer driver have been described above. As seen in the above description, in this embodiment, the printer driver 503 is provided with the processing module 611, and the processing module 611 takes charge of the transfer of the customized data between the application program 101 and the printer driver 503. Moreover, the processing module 611 performs the processing to cause the configuration module 519 to generate the PrintTicket and the PrintCapabilities from the print setting information delivered in the form of the DEVMODE structure. Thus, the processing adaptable to the processing in the V4 printer driver 503 takes place. In other words, it is possible to transfer the customized data by using the configuration module 519 provided by the OS and using the print setting edit module 511 provided by the vendor.

<Modified Example>

In the processing shown in FIGS. 7 and 8, in the case where the processing module 611 is called by the application program 101 two or more times, the processing module 611 performs the processing shown in FIGS. 7 and 8 every time the processing module 611 is called. In other words, the processing to generate the PrintTicket and the PrintCapabilities from the V4DEVMODE is performed every time the processing module 611 is called. For example, the following processing will be performed if the application program 101 wishes to cause the processing module 611 to perform the setting of the media:

(1) to cause the processing module 611 of the printer driver 503 to obtain the list of the supported media;
(2) to display the obtained list of the supported media on a user interface screen to cause the user to select the setting; and
(3) to cause the processing module 611 of the printer driver 503 to perform the setting of the media selected by the user.

Among them, the processing module 611 is called and the processing to generate the PrintTicket and the PrintCapabilities from the V4DEVMODE is performed in each of the processing (1) and the processing (3). Note that the above description is merely an example and the processing module 611 is likely to be called by the application program 101 two or more times in other modes as well.

Here, assuming that the V4DEVMODE delivered from the application program 101 is entirely the same V4DEVMODE, the PrintTicket and the PrintCapabilities to be generated will be the same PrintTicket and PrintCapabilities throughout the two or more times of the processing in this case. Accordingly, in a modified example, if the PrintTicket and the PrintCapabilities are once generated, the processing module 611 retains these pieces of information as a cache. Thereafter, if the processing module 611 is called again by the application program 101, the processing module 611 determines whether or not the V4DEVMODE delivered from the application program 101 is the same as the V4DEVMODE delivered last time. If the V4DEVMODE is the same, the processing module 611 uses the PrintTicket and the PrintCapabilities previously retained as the cache. This processing makes it possible to curtail the repetitive processing to generate the PrintTicket and the PrintCapabilities and thus to speed up the processing.

Figure 9B:
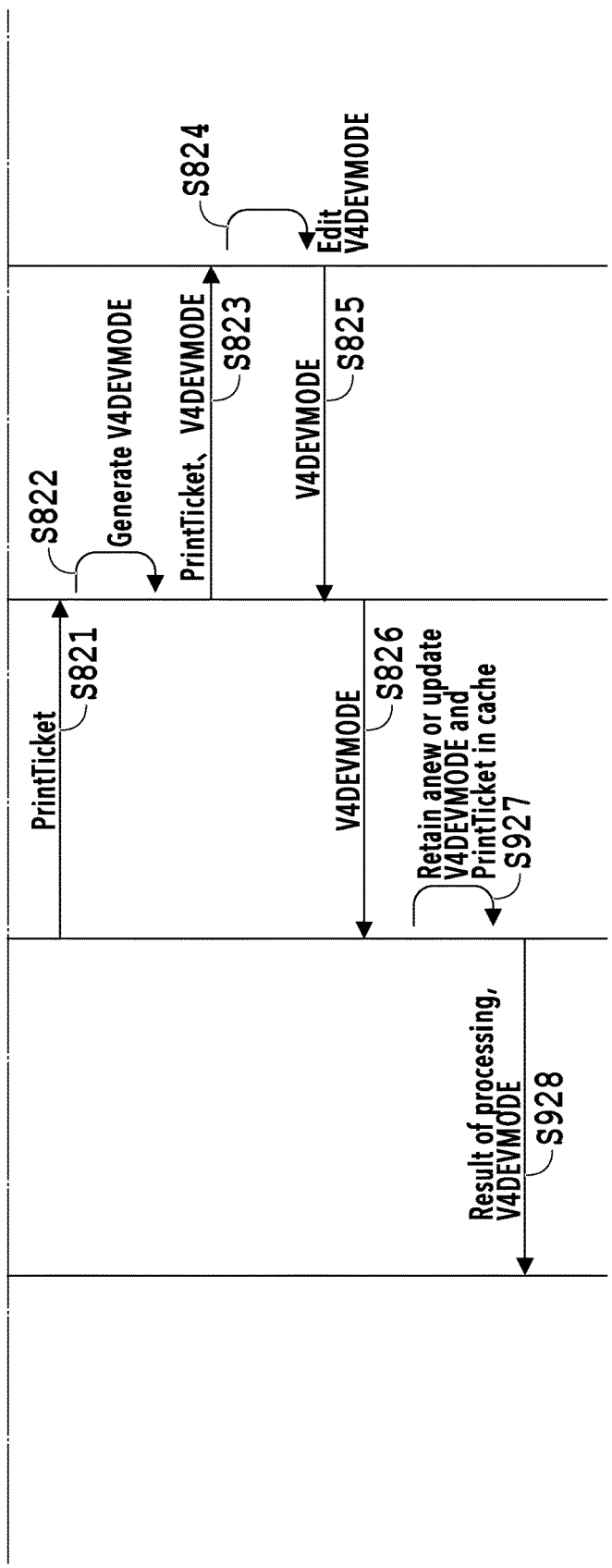

FIGS. 9A and 9B are a diagram showing a sequence obtained by speeding up the processing of FIGS. 8A and 8B. In step S901, the application program 101 calls the processing module 611. In this instance, the application program 101 delivers the specific instruction information and the V4DEVMODE that represents the current print setting information on the printer driver to the processing module 611 as described earlier.

In this modified example, in step S902, the processing module 611 checks whether or not the processing module 611 retains the V4DEVMODE, the PrintTicket, and the PrintCapabilities in the cache. If the data are not retained, the processing module 611 performs the processing to generate the PrintTicket and the PrintCapabilities as shown in steps S702 to S713 in FIG. 8A. In the case where the data are retained in the cache, the processing module 611 determines (compares) in step S903 whether or not the V4DEVMODE in the cache is the same as the received V4DEVMODE. If the V4DEVMODE data are different from each other, the processing module 611 performs the processing to generate the PrintTicket and the PrintCapabilities shown in steps S702 to S713 in FIG. 8A because the data in the cache cannot be used.

The processing module 611 does not generate the PrintTicket and the PrintCapabilities in the case where the V4DEVMODE in the cache is the same data as the received V4DEVMODE. Instead, the processing module 611 uses the PrintTicket and the PrintCapabilities retained in the cache.

Upon determination of the PrintTicket and the PrintCapabilities (either those retained in the cache or those generated) to use, the processing is started from step S814 on. The processing from steps S814 to S824 is the same as the processing described with reference to FIG. 8B and explanations thereof will be omitted.

Here, if the print settings are reflected in the processing in step S814, the V4DEVMODE and the PrintTicket are changed from the V4DEVMODE and the PrintTicket retained in the cache. Accordingly, in step S927, the processing module 611 updates the V4DEVMODE and the PrintTicket retained in the cache. Alternatively, if the cache does not retain the V4DEVMODE and the PrintTicket, then the V4DEVMODE and the PrintTicket are retained anew in the cache. Lastly, in step S928, the processing module 611 returns a result of the processing and the V4DEVMODE delivered in step S826 to the application program 101. As described above, by utilizing the V4DEVMODE, the PrintTicket, and the PrintCapabilities retained in advance, it is possible to curtail the processing to generate the PrintTicket and the PrintCapabilities, and thus to speed up the processing.

Although the processing in FIGS. 9A and 9B describe the modified example of the processing (the information setting processing) in FIGS. 8A and 8B, the PrintTicket and the PrintCapabilities retained in the cache can also be used in the case of the processing (the information reference and acquisition processing) in FIG. 7.

This embodiment has described the mode of generation of the PrintTicket and the PrintCapabilities by calling the configuration module 519 while using the API provided by the OS. However, it is also possible to replace this mode with the configuration to cause the processing module 611 to generate the PrintTicket and the PrintCapabilities from the V4DEVMODE without using the API provided by the OS. This case also has the same effect as that of the aforementioned configuration. However, as mentioned previously, the method of using the API provided by the OS seems general in terms of the configuration of the printing system involving the v4 printer driver.

<<Second Embodiment>>

The first embodiment has described the mode in which the processing module 611 takes charge of the processing to generate the PrintTicket and the PrintCapabilities from the V4DEVMODE that is delivered from the application program 101. Moreover, the first embodiment has described the system configuration and the flow of the processing that enable the transfer of the customized data by causing the processing module 611 to perform the processing based on the specific instruction information by using the generated PrintTicket and PrintCapabilities. However, the configuration of the first embodiment may be a case that it takes a long processing time to generate the PrintTicket and the PrintCapabilities. In particular, it takes a long processing time to generate the PrintCapabilities.

The above-described data transfer to and from any of the V3 GDI printer driver and the V3 XPS printer driver is realized by adopting the configuration that uses the V3DEVMODE and the database. Under the current circumstances where most of the printer drivers are the V3 printer drivers, it is necessary to build a new system in order to realize the configuration that uses the PrintTicket and the PrintCapabilities as in the configuration of the first embodiment, which leads to a high burden of implementation. In view of the above, in the second embodiment, the burden of implementation associated with the V4 architecture is reduced by diverting part of the method used in the V3 architecture. Specifically, the processing module 611 performs the processing to generate the PrintTicket from the V4DEVMODE delivered from the application program 101. Then, the processing module 611 generates the V3DEVMODE (third print setting information) from the generated PrintTicket. Thereafter, as with the configuration involving the V3 GDI printer driver and the V3 XPS printer driver, the transfer of the customized data is realized by employing the configuration that uses the V3DEVMODE and the database. As for the database, a stand-alone data base module may be incorporated into the V4 printer driver or incorporated into the processing module 611. The system configuration can adopt the same configuration described in the first embodiment, and explanations of the relevant configuration will be omitted herein.

<Sequence of Information Reference Processing (Acquisition Processing)>

Figure 10:
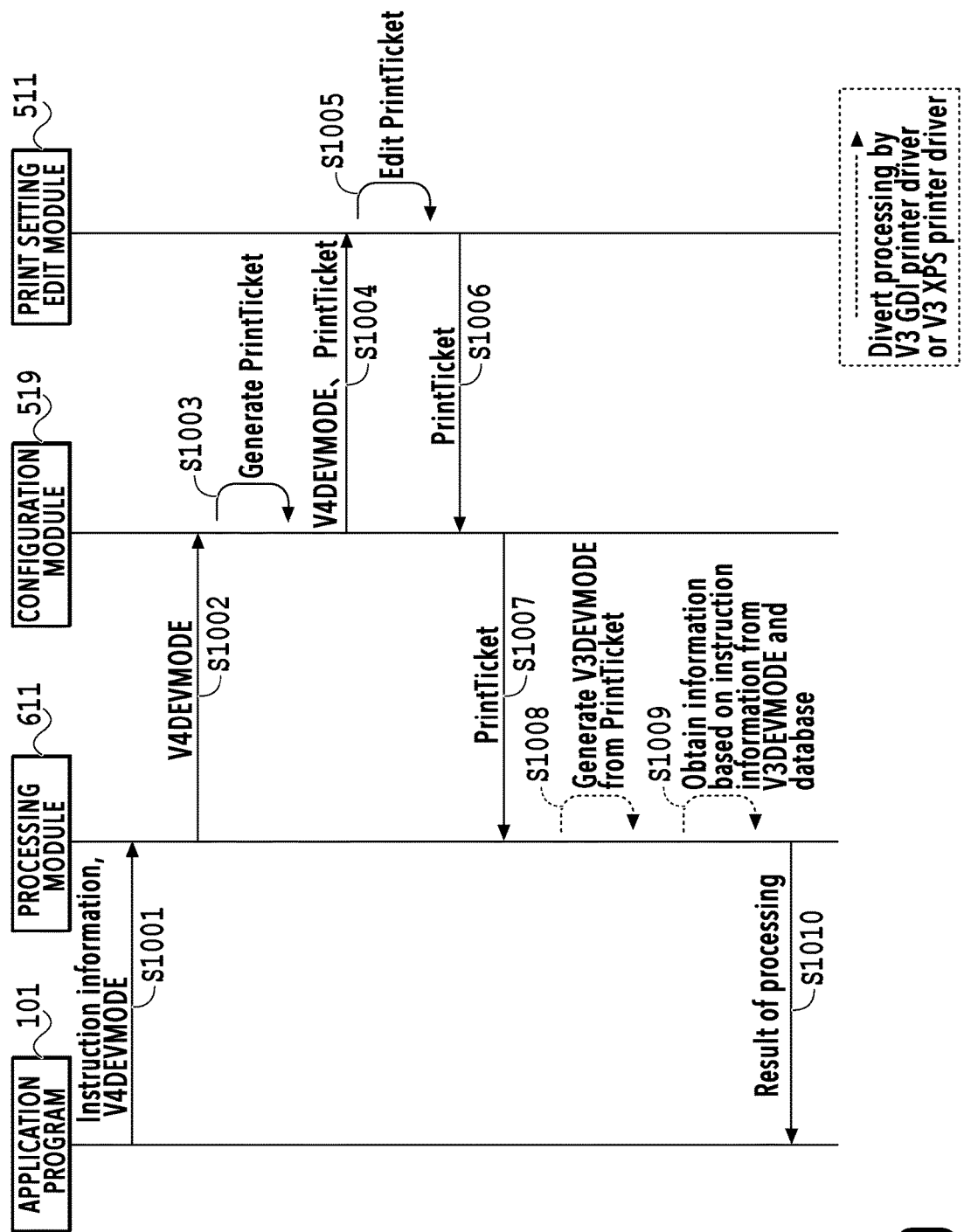
FIG. 10 is another exemplary sequence diagram of the information reference processing.

FIG. 10 is a diagram showing a processing sequence by the system of this embodiment. To be more precise, FIG. 10 is the diagram showing a sequence of information reference processing (acquisition processing). In step S1001, the application program 101 calls the processing module 611. In this instance, the application program 101 delivers the specific instruction information and the V4DEVMODE that represents the current print setting information on the printer driver. Next, the processing module 611 forwards the received V4DEVMODE to the configuration module 519 (S1002) so as to cause the configuration module 519 to generate the PrintTicket from the received V4DEVMODE. Thereafter, the PrintTicket is generated by the configuration module 519 (S1003). Then, the PrintTicket is edited by the print setting edit module 511 (S1004 to S1006), and the generated PrintTicket is returned to the processing module 611 (S1007). So far, the processing is the same as that in the first embodiment.

Next, in step S1008, the configuration module 519 generates the V3DEVMODE from the returned PrintTicket. The processing in step S1008 is the processing that is generally performed by the user interface module 203 of the V3 GDI printer driver or the V3 XPS printer driver. This embodiment implants and diverts the processing to the processing module 611. Note that the printer driver performs the processing by using the PrintTicket in the V3 architecture as well. Here, the processing to generate the V3DEVMODE from the PrintTicket is the processing that has already been performed in the V3 architecture.

Next, in step S1009, the processing module 611 obtains information based on the instruction information from the generated V3DEVMODE and from the database. Step S1009 represents the same processing as the processing indicated with S403 in FIG. 4, and this processing is implanted and diverted to the processing module 611. Lastly, in step S1010, the processing module 611 returns a result of the processing to the application program 101.

Here, in the processing of FIG. 10, the processing to generate the PrintTicket once from the V4DEVMODE and then to generate the V3DEVMODE from the PrintTicket takes place. As described previously, the PrintTicket that includes the functions provided as the standard by the OS, and the functions not defined by the OS standard and provided by the print setting edit module 511, are generated in the processing to generate the PrintTicket. If the V3DEVMODE is generated directly from the V4DEVMODE, the functions not defined by the OS standard will not be reflected to the V3DEVMODE. In this regard, it is possible to obtain the print setting information including the functions not defined by the OS standard by generating the PrintTicket once from the V4DEVMODE and then generating the V3DEVMODE from the PrintTicket.

<Sequence of Information Setting Processing>

Figure 11A:
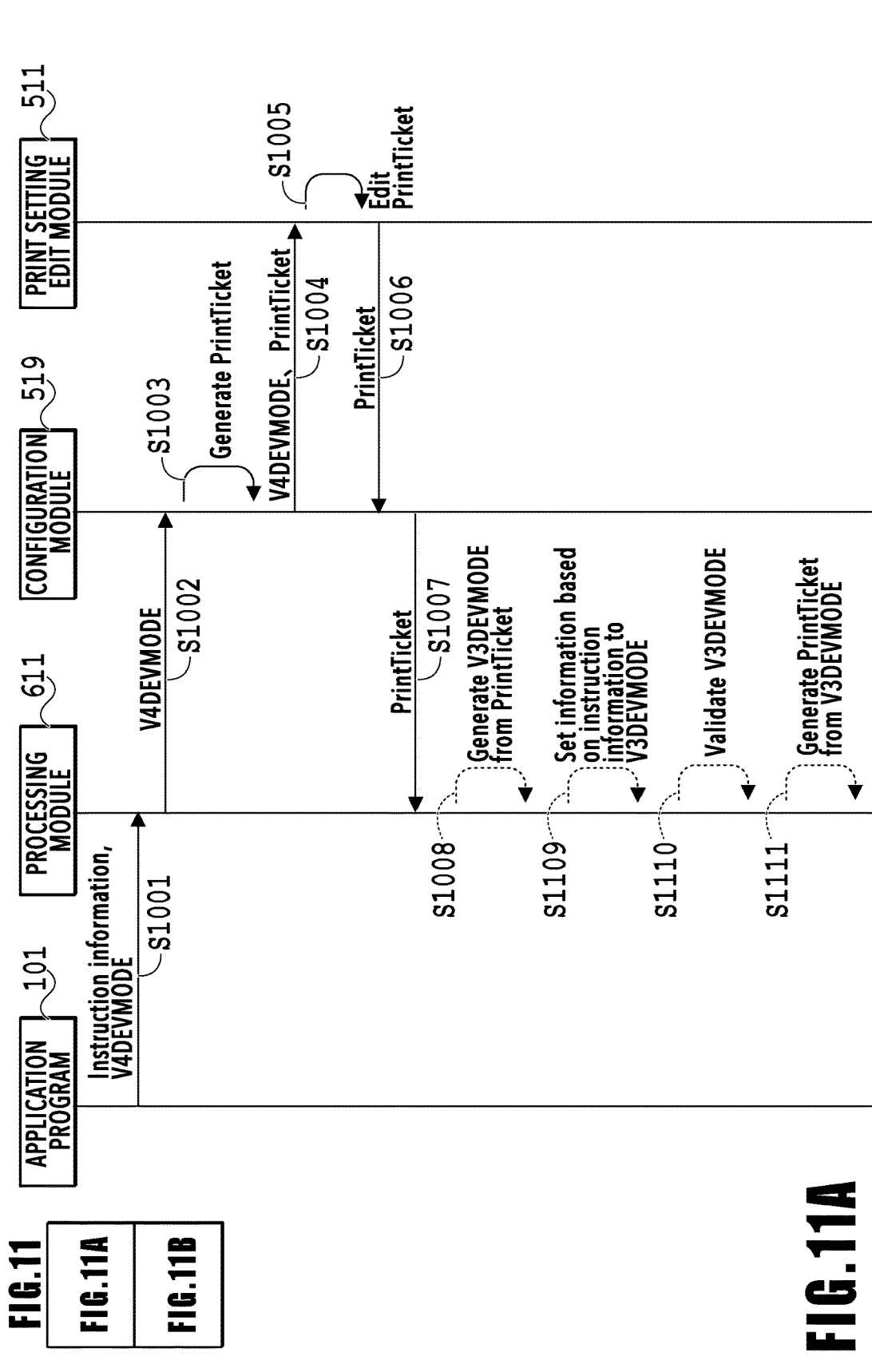
FIGS. 11A and 11B are another exemplary sequence diagram of the information setting processing.
Figure 11B:
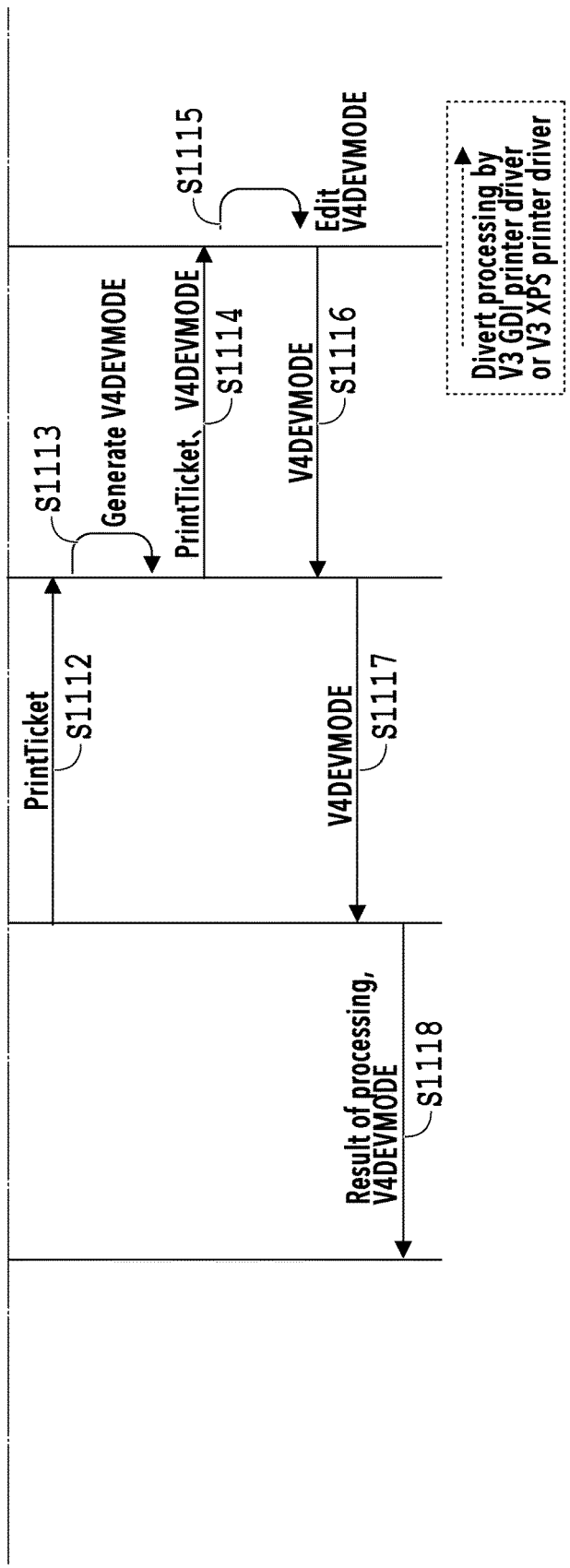

FIGS. 11A and 11B are a diagram showing a sequence of information setting processing in this embodiment. FIGS. 11A and 11B shows an example of the case in which the instruction information from the application program 101 is the instruction to set the media information in the print settings to photo paper, for instance. The processing from S1001 to S1008 is the same as that in FIG. 10 and explanations thereof will be omitted.

In step S1109, the processing module 611 sets the information based on the instruction information to the V3DEVMODE generated in step S1008. The step S1109 represents the same processing as the processing indicated with S403 in FIG. 4, and this processing is implanted and diverted to the processing module 611.

Then, in step S1110, the processing module 611 checks whether or not there is any mismatch in settings concerning the V3DEVMODE after setting the information based on the instruction information thereto. If there is a mismatch, the processing module 611 performs the validation processing in order to change the mismatch into an appropriate setting. Thereafter, in step S1111, the processing module 611 generates the PrintTicket from the V3DEVMODE subjected to the validation processing. Here, if the PrintTicket is generated in step S1111, the set values in the V3DEVMODE only regarding the information section based on the instruction information can be reflected to the PrintTicket generated in step S1007. By performing the processing as described above, the processing is speeded up as compared to the case of generating the PrintTicket from scratch. The processing in steps S1110 and S1111 is the processing that is generally performed by the user interface module 203 of the V3 GDI printer driver or the V3 XPS printer driver. This embodiment implants and diverts the processing to the processing module 611.

Next, in step S1112, the processing module 611 performs the processing to derive the V4DEVMODE from the generated PrintTicket. Specifically, the processing module 611 delivers the PrintTicket to the configuration module 519. Thereafter, in steps S1113 to S1117, the V4DEVMODE is generated via the configuration module 519 and the print setting edit module 511, and is returned to the processing module 611. The processing in steps S1113 to S1117 is the same as the processing in steps S822 to S826 in FIGS. 8B and 9B.

As described above, this embodiment does not require the processing to generate the PrintCapabilities from the PrintTicket unlike the first embodiment. Since the PrintCapabilities that requires the long processing time is not necessary, an improvement in processing speed is expected. Moreover, this embodiment realizes the transfer of the customized data by using the database as well as the V3DEVMODE used in the V3 architecture. In other words, this embodiment does not perform the processing by using the PrintTicket and the PrintCapabilities as described in the first embodiment. Thus, the implementation can be achieved with a small burden while diverting the V3 architecture.

<Modified Example>

In this embodiment as well, it is assumed that the processing module 611 is called by the application program 101 two or more times as with the case described in the first embodiment. In such a case, it is necessary to generate the V3DEVMODE from the V4DEVMODE via the generation of the PrintTicket every time the processing module 611 is called, whereby the processing speed slows down. As with the modified example of the first embodiment, this modified example adopts the mode of retaining the cache. Specifically, the processing module 611 retains the V4DEVMODE delivered from the application program 101 and the generated V3DEVMODE as the cache. This processing makes it possible to curtail the repetitive processing to generate the V3DEVMODE and thus to speed up the processing.

Figure 12B:
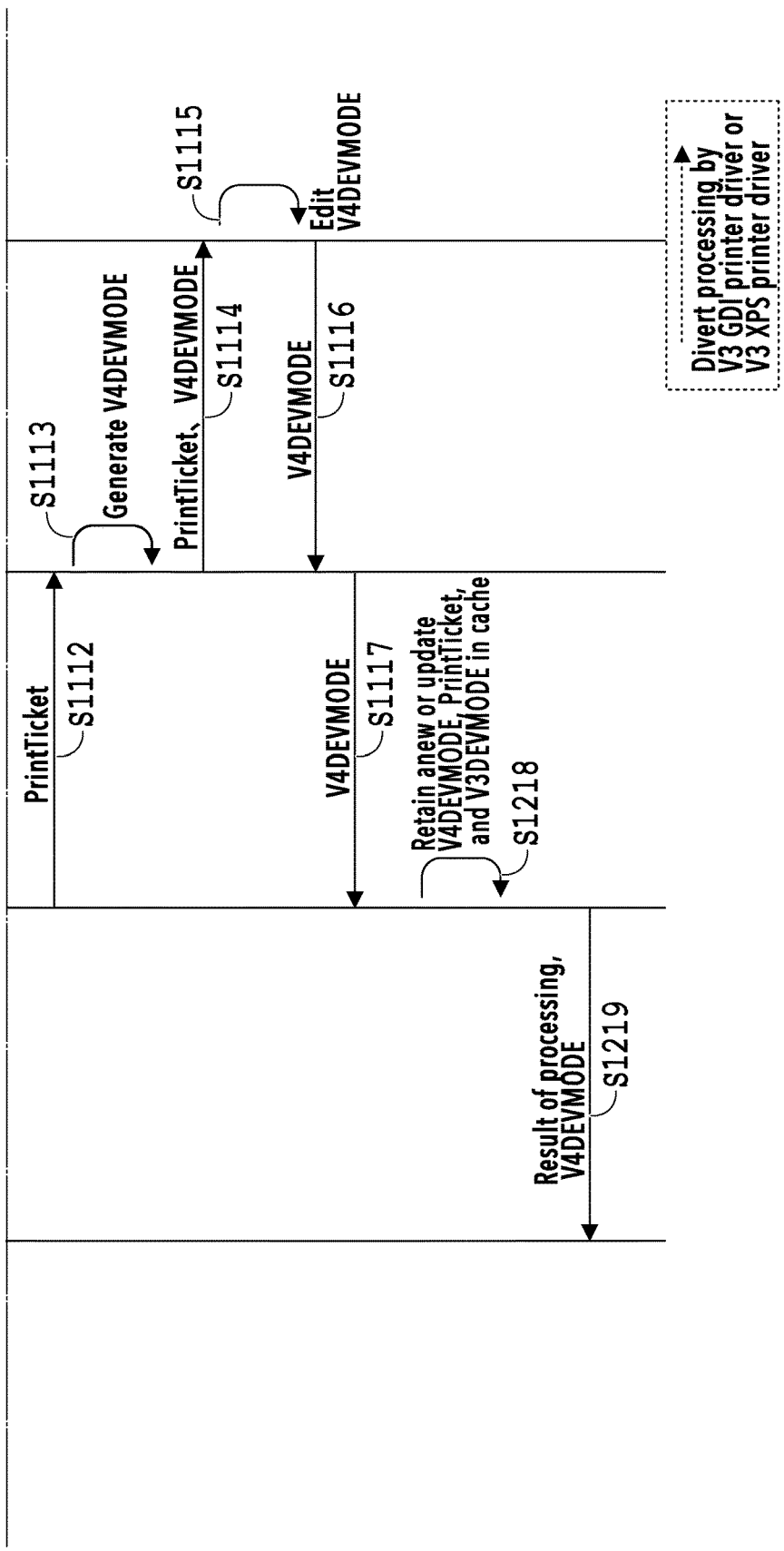

FIGS. 12A and 12B are a diagram showing a sequence obtained by speeding up the processing of FIGS. 11A and 11B. In step S1201, the application program 101 calls the processing module 611. In this instance, the application program 101 delivers the specific instruction information and the V4DEVMODE that represents the current print setting information on the printer driver.

In step S1202, the processing module 611 checks whether or not the processing module 611 retains the V4DEVMODE, the PrintTicket, and the V3DEVMODE in the cache. If the data are not retained, the processing module 611 performs the processing to generate the V3DEVMODE as shown in steps S1002 to S1008 in FIG. 11A.

In the case where the data are retained in the cache, the processing module 611 compares in step S1203 whether or not the V4DEVMODE in the cache is the same as the delivered V4DEVMODE. In the case where the V4DEVMODE data are different from each other, the processing module 611 performs the processing to generate the V3DEVMODE as shown in steps S1002 to S1008 in FIG. 11A. In the case where the V4DEVMODE in the cache is the same as the delivered V4DEVMODE, the processing module 611 does not generate the V3DEVMODE but uses the V3DEVMODE in the cache instead.

Upon determination of the V3DEVMODE (either the V3DEVMODE retained in the cache or the generated V3DEVMODE) to use, the process is started from step S1109 in FIGS. 12A and 12B on. The processing from steps S1109 to S1117 is the same as the processing described with reference to FIGS. 11A and 11B and explanations thereof will be omitted.

In step S1218, the processing module 611 updates the data in the cache because the V4DEVMODE and the V3DEVMODE may have been changed from the V4DEVMODE and the V3DEVMODE in the cache. Hence, in step S1218, the processing module 611 updates the V4DEVMODE, the PrintTicket, and the V3DEVMODE retained in the cache. Alternatively, if the cache does not retain these data, then the data are retained anew in the cache. Lastly, in step S1219, the processing module 611 returns a result of the processing and the V4DEVMODE delivered in step S1117 to the application program 101. As described above, by utilizing the V4DEVMODE and the V3DEVMODE retained in advance, it is possible to curtail the processing to generate the V3DEVMODE and thus to speed up the processing.

<<Third Embodiment>>

The system configurations enabling the transfer of the customized data between the application program and the V4 printer driver and the flows of the series of processing by the systems have been described in the first and second embodiments. However, according to the configurations of the first and second embodiments, the application program has to change the module to call depending on whether the printer driver is the V3 printer driver or the V4 printer driver. To be more precise, the support module 401 needs to be called in the case where the printer driver used therein is the V3 printer driver. On the other hand, the processing module 611 needs to be called in the case where the printer driver is the V4 printer driver. In the latter case, however, the processing to call the processing module 611 for the V4 printer driver is not implemented in an application program released to the market in the past. For this reason, the operation of the V4 printer driver as explained in the above-described embodiments is not executed (the processing module 611 is not called) in the latter case.

Figure 13:
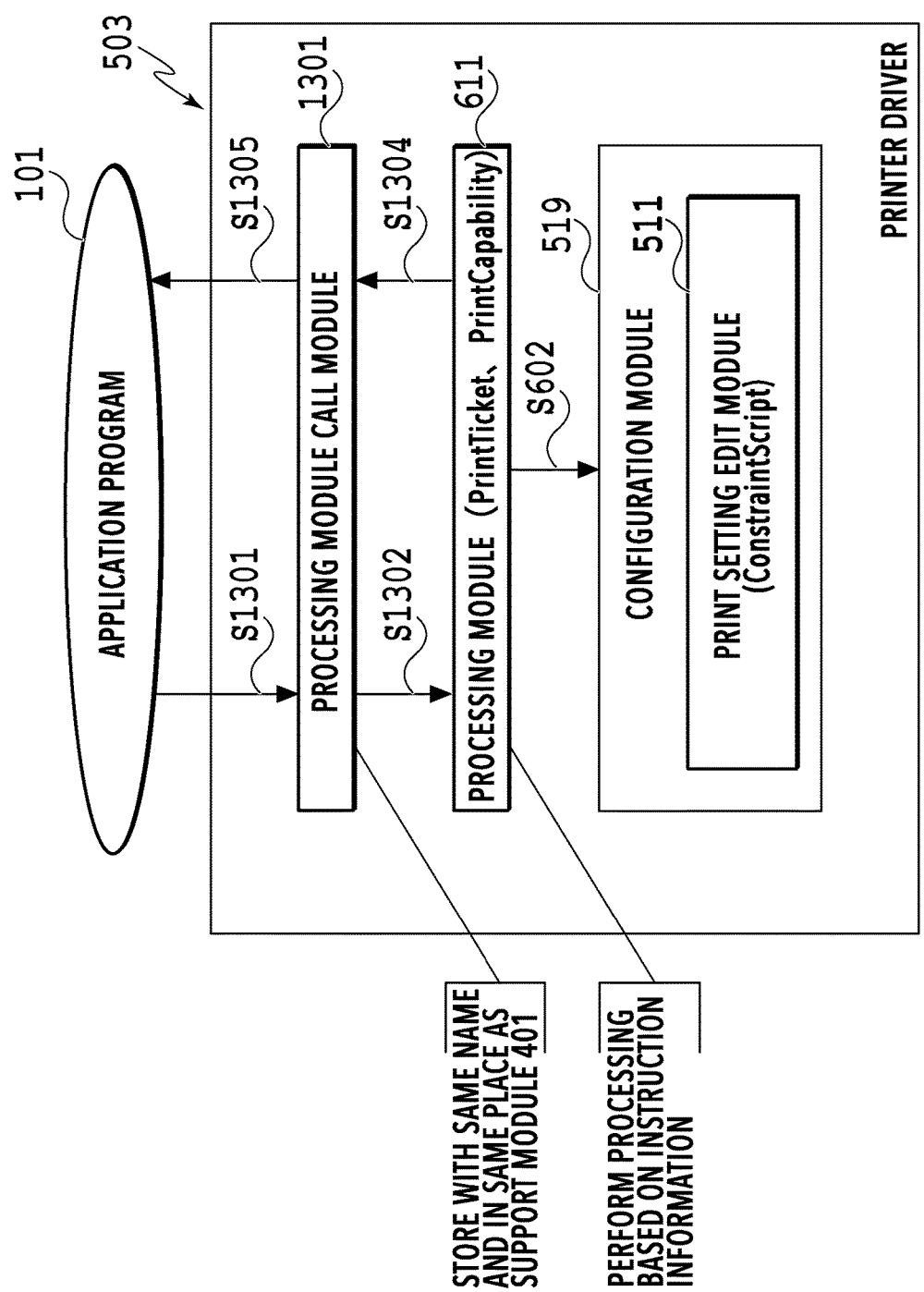
FIG. 13 is a configuration diagram of another system which transfers the customized data to and from the V4 printer driver.

Accordingly, in this embodiment, a call module configured to call the processing module is included in the printer driver. FIG. 13 is a configuration diagram of a system which transfers the customized data to and from the V4 printer driver. As shown in FIG. 13, a module (a processing module call module 1301) configured to call the processing module 611 is prepared and stored with the same module name and in the same storage place as the support module 401. In this way, even in the case of the V4 printer driver, the application program 101 calls the processing module call module 1301 located at the same place and having the same name as the support module 401 (S1301) as with the case of using the V3 printer driver. In this instance, the application program 101 delivers the specific instruction information such as the demand for the support media information concerning the printer driver, and the current print setting information on the printer driver. The print setting information is delivered in the same DEVMODE structure regardless of whether the printer driver is the V3 printer driver or the V4 printer driver. The called processing module call module 1301 calls the processing module 611 (S1302). In this instance, the processing module call module 1301 forwards the specific instruction information such as the demand for the support media information concerning the printer driver, and the current print setting information on the printer driver, which are received from the application program 101. The called processing module 611 performs the processing of steps S602 and S603. Detailed explanations thereof will be omitted. The processing module 611 returns a result of the processing to the processing module call module 1301 (S1304), and the processing module call module 1301 returns the result of the processing to the application program 101 (S1305).

In this way, even in the case of using the V4 printer driver, the application program 101 can be operated in the same processing as that by using the V3 printer driver. As a consequence, the application released in the market in the past can be operated with the V4 printer driver as well.

In other words, the application program 101 does not have to discern whether the printer driver is based on the V3 architecture or the V4 architecture. Here, the customized data to be delivered from the application program 101 to the V4 printer driver 503 is the same as that delivered in the case of the V3 printer driver. Specifically, the application program 101 delivers the Escape code, the DEVMODE, and the specific instruction information to the processing module 611 of the printer driver 503. Here, the Escape code is not used in the V4 architecture. Accordingly, the Escape code delivered to the processing module 611 will be ignored by the processing module 611.

<<Other Embodiments>>

Each of the above-described embodiments has explained the example of the mode in which the application program 101 retains the print setting information in the form of the DEVMODE structure. However, among the application programs, there is an application program designed to store the print setting information in the form of the PrintTicket. The present invention is also applicable to the case of using the application program that handles the PrintTicket mentioned above. To be more precise, the processing module 611 may perform the processing as explained in any of the above-described embodiments by using the PrintTicket delivered from the application program. In this instance, since the PrintTicket is prepared in advance, the processing module 611 may skip the processing to generate the PrintTicket. In the meantime, if the information setting takes place, the processing module 611 may return the validated PrintTicket to the application program instead of returning the V4DEVMODE structure thereto.

According to this disclosure, it is possible to transfer the data concerning the customized print settings between the application program and the printer driver.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-199801, filed Oct. 13, 2017, which is hereby incorporated by reference wherein in its entirety.

What is claimed is:

1. A method of communicating data concerning a print setting between an application designed to run on an operating system and a printer driver based on V4 architecture, comprising the steps of:
    receiving a request instruction from the application, the request instruction including
    first print setting information retained by the application, and
    a demand for prescribed processing concerning the print setting;
    transmitting an instruction to an information generation component provided by the operating system to generate second print setting information from the received first print setting information, the second print setting information being formed in a data structure processible in the printer driver;
    receiving the second print setting information generated in response to the instruction;
    executing the prescribed processing based on the received second print setting information; and
    returning a result of the prescribed processing to the application.

2. The method according to claim 1, wherein
    the information generation component transmits the generated second print setting information to an editing component configured to edit a customized print setting not provided by the information generation component, and
    the information generation component returns the second print setting information edited by the editing component in response to the instruction to generate.

3. The method according to claim 1, wherein the prescribed processing includes information reference processing.

4. The method according to claim 1, further comprising the steps of:
    transmitting an instruction to the information generation component to generate printing capability information on the printer driver from the received second print setting information; and
    receiving the printing capability information generated in response to the instruction, wherein
    the step of executing the prescribed processing includes executing the prescribed processing further based on the printing capability information.

5. The method according to claim 4, wherein
    the information generation component transmits the generated printing capability information to an editing component configured to perform customized editing not provided by the information generation component, and
    the information generation component returns the printing capability information edited by the editing component in response to the instruction to generate.

6. The method according to claim 4, wherein the prescribed processing includes information setting processing.

7. The method according to claim 6, further comprising the steps of:
    transmitting an instruction to the information generation component to validate the second print setting information to which the information is set in the prescribed processing;
    receiving the second print setting information validated in response to the instruction;

transmitting an instruction to the information generation component to generate the first print setting information from the validated second print setting information;

receiving the first print setting information generated in response to the instruction; and transmitting the received first print setting information and the result of the prescribed processing to the application.

8. The method according to claim 4, further comprising the step of:

in a case where a retention component retains the first print setting information, the second print setting information, and the printing capability information used in the past, comparing whether the first print setting information received from the application is the same as the retained first print setting information, wherein in a case where the first print setting information received from the application is the same as the retained first print setting information, the step of executing the prescribed processing includes executing the prescribed processing by using at least one of the retained second print setting information and the retained printing capability information.

9. The method according to claim 8, further comprising the step of:

causing the retention component to retain the first print setting information received from the application, the generated second print setting information, and the generated printing capability information after the prescribed processing is executed.

10. A method of communicating data concerning a print setting between an application designed to run on an operating system and a printer driver based on V4 architecture, comprising the steps of:

receiving a request instruction from the application, the request instruction including first print setting information retained by the application, and a demand for prescribed processing concerning the print setting;

transmitting an instruction to an information generation component provided by the operating system to generate second print setting information from the received first print setting information, the second print setting information being formed in a data structure processible in the printer driver;

receiving the second print setting information generated in response to the instruction;

generating third print setting information from the received second print setting information, the third print setting information being formed in a data structure processible in a printer driver based on V3 architecture;

executing the prescribed processing by using the third print setting information;

generating the second print setting information from the third print setting information;

transmitting an instruction to the information generation component to generate the first print setting information from the second print setting information generated from the third print setting information; and returning to the application a result of the prescribed processing and the first print setting information generated in response to the instruction.

11. The method according to claim 10, further comprising the step of:

in a case where a retention component retains the first print setting information, the second print setting information, and the third print setting information used in the past, comparing whether the first print setting information received from the application is the same as the retained first print setting information, wherein in a case where the first print setting information received from the application is the same as the retained first print setting information, the step of executing the prescribed processing includes executing the prescribed processing by using the retained third setting information.

12. The method according to claim 10, wherein the third print setting information is data having a DEVMODE structure to be used in V3 architecture.

13. The method according to claim 1, wherein the first print setting information is data having a DEVMODE structure to be used in the V4 architecture.

14. The method according to claim 1, wherein the second print setting information is PrintTicket data.

15. The method according to claim 1, wherein the printer driver based on the V4 architecture lacks a feature to use the ExtEscape function.

16. An information processing apparatus configured to communicate data concerning a print setting between an application designed to run on an operating system and a printer driver based on V4 architecture, comprising:

a processing component provided in the printer driver based on the V4 architecture and configured to perform processing in response to a request concerning the print setting from the application, wherein the processing component performs receiving a request instruction from the application, the request instruction including first print setting information retained by the application, and a demand for prescribed processing concerning the print setting;

transmitting an instruction to an information generation component provided by the operating system to generate second print setting information from the received first print setting information, the second print setting information being formed in a data structure processible in the printer driver, receiving the second print setting information generated in response to the instruction, executing the prescribed processing based on the received second print setting information, and returning a result of the prescribed processing to the application.

17. An information processing apparatus configured to communicate data concerning a print setting between an application designed to run on an operating system and a printer driver based on V4 architecture, comprising:

a processing component provided in the printer driver based on the V4 architecture and configured to perform processing in response to a request concerning the print setting from the application, wherein the processing component performs receiving a request instruction from the application, the request instruction including first print setting information retained by the application, and a demand for prescribed processing concerning the print setting, transmitting an instruction to an information generation component provided by the operating system to generate second print setting information from the received first print setting information, the second print setting information being formed in a data structure processible in the printer driver, receiving the second print setting information generated in response to the instruction, generating third print setting information from the received second print setting information, the third print setting information being formed in a data structure processible in a printer driver based on V3 architecture, executing the prescribed processing by using the third print setting information, generating the second print setting information from the third print setting information, transmitting an instruction to the information generation component to generate the first print setting information from the second print setting information generated from the third print setting information, and returning to the application a result of the prescribed processing and the first print setting information generated in response to the instruction.

* * * * *